(12) United States Patent
Petty

(10) Patent No.: US 10,835,842 B2
(45) Date of Patent: Nov. 17, 2020

(54) ULTRASONIC TRANSDUCER SYSTEM FOR DEGASSING OF HYDROCARBON PRODUCTION FLUID

(71) Applicant: COG Operating LLC, Midland, TX (US)

(72) Inventor: Brian Colt Petty, Midland, TX (US)

(73) Assignee: COG Operating LLC, Midland, TX (US)

( * ) Notice: Subject to any disclaimer, the term of this patent is extended or adjusted under 35 U.S.C. 154(b) by 309 days.

(21) Appl. No.: 15/978,485

(22) Filed: May 14, 2018

(65) Prior Publication Data
US 2019/0344200 A1   Nov. 14, 2019

(51) Int. Cl.
*B01D 19/00*   (2006.01)
*C10G 31/00*   (2006.01)

(52) U.S. Cl.
CPC ......... *B01D 19/0078* (2013.01); *C10G 31/00* (2013.01)

(58) Field of Classification Search
CPC .. G10K 11/004; G10K 11/006; G10K 11/008; G10K 15/00; G10K 15/02; G10K 15/04; G01S 1/042; G01S 1/0423; G01S 1/74; G01S 1/75; G01S 1/751; C10G 31/00; B01D 19/0078
See application file for complete search history.

(56) References Cited

U.S. PATENT DOCUMENTS

| | | | | |
|---|---|---|---|---|
| 3,560,914 A | * | 2/1971 | Webb | G01D 21/02 367/157 |
| 4,682,308 A | * | 7/1987 | Chung | B06B 1/085 367/31 |
| 4,805,156 A | * | 2/1989 | Attali | E21B 47/005 367/35 |

(Continued)

FOREIGN PATENT DOCUMENTS

GB    2420510 A    5/2006

OTHER PUBLICATIONS

Schmidt, D. et al.; "New Technologies for Safe and Cost Effective Oil Conditioning in North Dakota" Status report to the North Dakota Oil & Gas Research Program, Final Report; Jun. 1, 2017; pp. 1-49.

*Primary Examiner* — Natalie Huls
(74) *Attorney, Agent, or Firm* — Bracewell LLP; Christopher L. Drymalla

(57) ABSTRACT

Provided are embodiments that include an ultrasonic transducer system including an ultrasonic transducer assembly adapted to be disposed in an interior region of an ultrasonic transducer housing, and including a first ultrasonic transducer head adapted to transmit a first set of ultrasonic signals (including a first transmission surface adapted to direct the first set of ultrasonic signals through the first transmission surface), a second ultrasonic transducer head adapted to transmit a second set of ultrasonic signals (including a second transmission surface adapted to direct the second set (Continued)

of ultrasonic signals through the second transmission surface), and a transducer biasing member disposed between the first ultrasonic transducer head and the second ultrasonic transducer head and adapted to bias the first and second ultrasonic transducers in opposite directions to bias the first and second transmission surfaces against opposite portions of an interior surface of the ultrasonic transducer housing.

28 Claims, 10 Drawing Sheets

(56) References Cited

U.S. PATENT DOCUMENTS

| | | | |
|---|---|---|---|
| 5,641,228 A | 6/1997 | Prokopenko | |
| 6,666,095 B2* | 12/2003 | Thomas | G01N 29/223 73/592 |
| 7,697,375 B2* | 4/2010 | Reiderman | E21B 47/005 367/168 |
| 10,392,926 B2* | 8/2019 | Huang | |
| 2005/0115405 A1 | 6/2005 | Yamada | |
| 2010/0011867 A1* | 1/2010 | van Klooster | G10K 11/004 73/644 |
| 2013/0167654 A1* | 7/2013 | Ueberschlag | G01F 15/18 73/861.18 |
| 2013/0192386 A1* | 8/2013 | Ueberschlag | G10K 11/04 73/861.18 |
| 2016/0023244 A1 | 1/2016 | Zhuang et al. | |
| 2019/0101423 A1* | 4/2019 | Ueberschlag | G01F 1/662 |
| 2019/0345396 A1* | 11/2019 | Petty | B01D 19/0078 |

\* cited by examiner

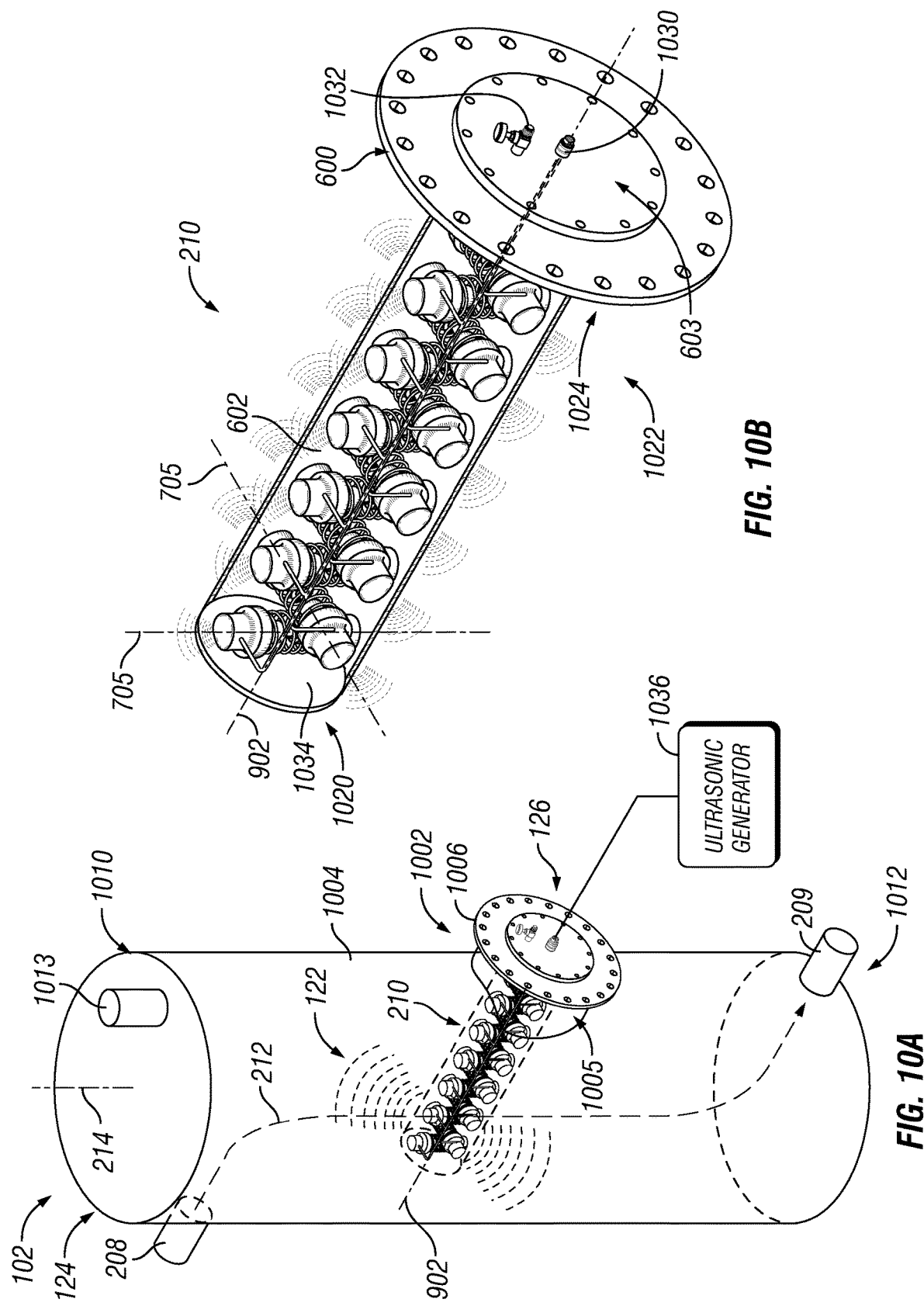

ULTRASONIC TRANSDUCER SYSTEM FOR DEGASSING OF HYDROCARBON PRODUCTION FLUID

FIELD

Embodiments relate generally to processing hydrocarbon production fluid, and more particularly to ultrasonic degassing of hydrocarbon production fluid.

BACKGROUND

Production of hydrocarbons, such as oil and natural gas, typically involves extracting the hydrocarbons trapped in a hydrocarbon reservoir of a subsurface formation. During production operations, production fluid containing hydrocarbons is extracted from the reservoir and directed to the surface by way of a well, often referred to as a "hydrocarbon well" or an "oil well". The production fluid is normally transported to downstream facilities, such as refineries and export terminals, by way of a distribution network of midstream facilities, such as pipelines, tanks and transport vehicles.

In many instances, the production fluid is subjected to various forms of processing to, for example, clean the production fluid of unwanted substances, or otherwise prepare the production fluid for storage, transport and use. For example, raw production fluid flowing from a well may contain a mixture of substances, such as crude oil, natural gas and water, and the raw production fluid may be processed to separate the various substances. This can include separating the water and gas from the production fluid in an effort to obtain production fluid that is predominately oil. The processing is sometimes conducted at the well-site shortly after the production fluid exits the well. For example, the production fluid may be processed at a surface unit located at the well-site to remove water or gas, before the production fluid is introduced into a pipeline, a tank or a transport vehicle of a distribution network.

A point in the distribution where the production fluids move from one entity's ownership or control to another entities ownership or control, is sometimes referred to as a "point of sale" ("POS"). For example, a POS may refer to a point at an outlet valve of a surface unit located at a well-site, where production fluid exits the well-site facilities, and enters a purchaser's pipeline or is loaded into a purchaser's transport vehicle. Often times, production fluids are processed to meet requirements at a POS, or at other points along the distribution network.

SUMMARY

Applicants have recognized that processing hydrocarbon production fluid (referred to here as "production fluid") is an important aspect of hydrocarbon production, distribution and refining, especially in view of the importance that production fluid have a suitable composition, such as a minimal amount of water or entrained gases, to meet requirements for production fluid distribution and use. The importance is ever increasing as requirements for production fluid composition are becoming more stringent. Applicants have recognized that lowering the gas content of production fluids can reduce the vapor pressure of the production fluid, and that it can be advantageous to significantly reduce the gas content of production fluids given that many purchasers now requiring production fluid to have a relatively low vapor pressure, such as a Reid Vapor Pressure (RVP) below 9. Unfortunately, if production fluid does not meet requirements, the production fluid may be rejected. This can result in direct financial losses due to lost sales of the production fluid, and indirect financial losses associated with further processing of the production fluid to meet requirements, or shut-in of the well from which the production fluid was produced. This can amount to tens-of-thousands of dollars of losses per well, per day.

Applicants have recognized that although some existing production fluid processing techniques are suitable for certain conditions and for certain requirements, existing production fluid processing techniques may not be capable of meeting requirements under certain conditions, especially in the case of heightened requirements. For example, existing techniques for removing entrained gas from production fluid (referred to as "degassing" of the production fluid) involve heating the production fluid to increase the temperature of the production fluid, and rapidly reducing the pressure of the production fluid to cause gas entrained in the production fluid (referred to as "entrained gas") to separate from the production fluid. Although such heating and pressure based techniques can be suitable for certain conditions, they may not be suitable for other conditions. For example, although these techniques can be suitable for use in warm climates, where the required heating is minimal, in cold climates or during relatively cold periods in warm climates, it may not be possible to heat a production fluid to a high enough temperature to facilitate the separation of the entrained gas from the production fluid. This scenario has been observed in cold climates and during relatively cold winters, where significantly increasing the heating of the production fluid is ineffective at causing the entrained gas to separate from the production fluid. As a result, the RVP of the production fluid may not be reduced to an acceptable level to meet purchaser requirements, and the production fluid may be rejected by purchasers. Moreover, even in instances in which it is possible to heat production fluid to a high enough temperature to facilitate the separation of gas from the production fluid, the cost to heat the production fluid can be excessive, and the time required to heat the production fluid can create delays that further increase the costs and complexity of processing the production fluid.

Recognizing these and other shortcomings of existing techniques for degassing production fluid, Applicants have developed novel systems and methods for degassing hydrocarbon production fluid using ultrasonic signals. In some embodiments, an ultrasonic signal is introduced into production fluid including a hydrocarbon fluid mixture of a hydrocarbon liquid and gas entrained in the hydrocarbon liquid (or "entrained gas"), to facilitate the separation and removal of the entrained gas from the hydrocarbon liquid. In some embodiments, an ultrasonic hydrocarbon production fluid degassing system includes a hydrocarbon degassing unit, including a vessel (e.g., a vapor recovery vessel) that directs production fluid along a flowpath, and an ultrasonic transducer system that transmits ultrasonic signals into the production fluid as it travels along the flowpath. The ultrasonic signals cause the entrained gas to separate from the hydrocarbon liquid, and the gas is removed, for example, by way of a vapor recovery system (VRS).

In some embodiments, the ultrasonic signals have a frequency that is effective to cause the entrained gas to separate from the hydrocarbon liquid. For example, the ultrasonic signals may have a frequency in the range of about 20 kilohertz (kHz) to about 40 kHz, such as about 25 kHz. In some embodiments, the ultrasonic transducer system includes one or more ultrasonic transducer heads. For example, the ultrasonic transducer system may include multiple ultrasonic transducer heads that transmit respective subsets of the ultrasonic signals into the production fluid. Such a configuration can increase the exposure of the production fluid to ultrasonic signals, promoting the separation of the entrained gas from the production fluid.

In some embodiments, the ultrasonic transducer system includes one or more ultrasonic transducer units including ultrasonic transducer heads used to generate the ultrasonic signals. For example, the ultrasonic transducer system may include one more ultrasonic transducer units disposed in the flowpath of the production fluid, with each ultrasonic transducer unit including one or more ultrasonic transducer heads that generate the ultrasonic signals that are transmitted into the production fluid. In some embodiments, an ultrasonic transducer unit includes an ultrasonic transducer housing and one or more ultrasonic transducer heads disposed in the housing. For example, an ultrasonic transducer unit may include a cylindrical shaped housing having ultrasonic transducer heads disposed along a length of an interior of housing. The housing may be positioned to intersect the flowpath of the production fluid and, during use, the ultrasonic transducer heads can be activated to transmit ultrasonic signals through the wall of the housing, into the production fluid located around the exterior of the housing. In some embodiments, multiple ultrasonic transducer units are provided in the flowpath of the production fluid. For example, in the case of the vessel being a cylindrical vapor recovery vessel (VRV), such as a vapor recovery tower (VRT) having a flowpath that extends along a length of the interior of vessel, ultrasonic transducer units may be provided along the length of the interior of vessel. Such a configuration of the ultrasonic transducer system may provide for generating ultrasonic signals in a variety of locations, thereby increasing the exposure of the production fluid to ultrasonic signals and further promoting the separation of the entrained gas from the production fluid.

In some embodiments, an ultrasonic transducer unit includes one or more ultrasonic transducer assemblies. An ultrasonic transducer assembly may include one more ultrasonic transducer heads and a transducer biasing member that biases transmission surfaces of the one or more ultrasonic transducer heads into contact with the interior surface of the ultrasonic transducer housing. The resulting contact between the transmission surface of the ultrasonic transducer head and the interior surface of the housing may facilitate the transmission of the ultrasonic signals through the wall of the housing and into the production fluid located around the exterior of the housing.

In some embodiments, an ultrasonic transducer assembly includes two opposite facing ultrasonic transducer heads and a transducer biasing member that biases the transmission surfaces of the multiple ultrasonic transducer heads in opposite directions, into contact with the interior surface of the housing. For example, a transducer biasing member may be disposed between two transducer heads, and provide an outward biasing force to urge the two ultrasonic transducer heads and their respective transmission surfaces outward, in opposite directions from one another, and into contact with opposite portions of the interior surface of the housing. Thus, a single biasing member may operate to position two ultrasonic transducer heads within the housing. Moreover, such a biasing member may facilitate installation, repositioning, or removal of ultrasonic transducer heads. For example, the biasing member of an ultrasonic transducer assembly may be compressed to retract the ultrasonic transducer heads, enabling the ultrasonic transducer assembly (including the pair of ultrasonic transducer heads and the biasing member) to be installed into, repositioned within, or removed from the interior of the housing. The biasing member may be decompressed (or expanded) to bias the transmission surfaces of ultrasonic transducer heads into contact with the interior surface of the housing, securing the ultrasonic transducer assembly in place within the housing.

In some embodiments, multiple ultrasonic transducer assemblies are disposed inside the ultrasonic transducer housing. For example, multiple ultrasonic transducer assemblies may be disposed along a length of the interior of the housing, in series and linearly offset from one another. In some embodiments, the orientations of the ultrasonic transducer assemblies is varied. For example, adjacent ultrasonic transducer assemblies may be angularly offset from one another. In some instances, each of the transducer assemblies may be offset from adjacent transducer assemblies by an offset angle of 90°, such that a first ultrasonic transducer assembly is oriented an angle of 0°, a second ultrasonic transducer assembly (adjacent the first ultrasonic transducer assembly) is oriented an angle of 90°, a third ultrasonic transducer assembly (adjacent the second ultrasonic transducer assembly) is oriented an angle of 0°, and so forth. Such a configuration of the ultrasonic transducer unit may provide for generating the ultrasonic signals in a variety of locations and orientations, thereby increasing the exposure of the production fluid to ultrasonic signals to promote the separation of the entrained gas from the production fluid.

In some embodiments, a production fluid ultrasonic degassing system is employed in combination with other processing systems to further increase the effectiveness of the degassing and processing of the production fluid. For example, a production fluid processing system may include an ultrasonic degassing unit, a water separation system and a heater treater system. The water separation system may separate and remove water from the production fluid, and the ultrasonic production fluid degassing system and the heater treater system may work to separate and remove entrained gas from the production fluid. The ultrasonic production fluid degassing system may be employed at various locations and stages in the production fluid processing system. For example, the ultrasonic degassing unit may be a component of a well-site surface facility, that provides for separating and removing entrained gas from production fluid, upstream of a point of sale (POS) from a producer (e.g., a well operator) to a midstream entity (e.g., an oil and gas purchaser). The well-site surface facility may include, for example, a production fluid processing system including the ultrasonic production fluid degassing system, and a water separation system and a heater treater system located upstream of the ultrasonic degassing unit.

Provided in some embodiments is an ultrasonic transducer system including: a hollow cylindrical ultrasonic transducer housing including an interior surface defining an interior region; and an ultrasonic transducer assembly adapted to be disposed in an interior region of the ultrasonic transducer housing. The ultrasonic transducer assembly including: a first ultrasonic transducer head adapted to transmit a first set of ultrasonic signals (the first ultrasonic transducer head including a first transmission surface and being adapted to direct the first set of ultrasonic signals through the first transmission surface); a second ultrasonic transducer head adapted to transmit a second set of ultrasonic signals (the second ultrasonic transducer head including a second transmission surface and being adapted to direct the second set of ultrasonic signals through the second transmission surface); and a transducer biasing member disposed between the first ultrasonic transducer head and the second ultrasonic transducer head. The transducer biasing member adapted to bias the first ultrasonic transducer and the second ultrasonic transducer in opposite directions to bias the first transmission surface of the first ultrasonic transducer against a first portion of the interior surface of the ultrasonic transducer housing and to bias the second transmission surface of the second ultrasonic transducer against a second portion of the interior surface of the ultrasonic transducer housing that is opposite the first portion of the interior surface of the ultrasonic transducer housing.

In some embodiments, the interior surface of the ultrasonic transducer housing includes a cylindrical shape, the first transmission surface of the first ultrasonic transducer includes a first curvature that is complementary to a curvature of the cylindrical shape of the interior surface of the ultrasonic transducer housing, and the second transmission surface of the second ultrasonic transducer includes a second curvature that is complementary to the curvature of the cylindrical shape of the interior surface of the ultrasonic transducer housing. In certain embodiments, the transducer biasing member includes a spring. In some embodiments, the spring includes a coil spring. In certain embodiments, the system further includes a plurality of ultrasonic transducer assemblies disposed along a length of the interior region of the ultrasonic transducer housing, where the plurality of ultrasonic transducer assemblies include the ultrasonic transducer assembly. In some embodiments, the system further includes: a second ultrasonic transducer assembly adapted to be disposed in the interior region of the ultrasonic transducer housing. The second ultrasonic transducer assembly including: a third ultrasonic transducer head adapted to transmit a third set of ultrasonic signals (the third ultrasonic transducer head including a third transmission surface and being adapted to direct the third set of ultrasonic signals through the third transmission surface); a fourth ultrasonic transducer head adapted to transmit a fourth set of ultrasonic signals (the fourth ultrasonic transducer head including a fourth transmission surface and being adapted to direct the fourth set of ultrasonic signals through the fourth transmission surface); and a second transducer biasing member disposed between the third ultrasonic transducer head and the fourth ultrasonic transducer head. The second transducer biasing member adapted to bias the third ultrasonic transducer and the fourth ultrasonic transducer in opposite directions to bias the third transmission surface of the third ultrasonic transducer against a third portion of the interior surface of the ultrasonic transducer housing and to bias the fourth transmission surface of the fourth ultrasonic transducer against a fourth portion of the interior surface of the ultrasonic transducer housing that is opposite from the third portion of the interior surface of the ultrasonic transducer housing. In certain embodiments, the first and second ultrasonic transducers are biased in opposite directions along a first axis, and the third and fourth ultrasonic transducers are biased in opposite directions along a second axis. In some embodiments, the first axis is angularly offset from the second axis. In certain embodiments, the first axis is angularly offset from the second axis by an angle of 90 degrees. In some embodiments, the first axis is linearly offset from the second axis. In certain embodiments, the first axis is parallel to the second axis. In some embodiments, the ultrasonic transducer housing includes an ultrasonic transducer housing body, and an ultrasonic transducer housing access panel adapted to be removably coupled to an end of the ultrasonic transducer housing body to define the interior region of the ultrasonic transducer housing. In some embodiments, the ultrasonic transducer housing body includes a flange adapted to couple to a complementary flange of a vessel. In certain embodiments, the complementary flange of the vessel includes a manway access hatch flange. In some embodiments, the ultrasonic transducer housing access panel includes a purge port adapted to enable the injection of substances into the interior region of the ultrasonic transducer housing. In certain embodiments, the ultrasonic transducer housing access panel includes an electrical pass through including a conduit for the passage of an electrical wiring harness between ultrasonic transducer assemblies disposed in the interior region of the ultrasonic transducer housing and an ultrasonic generator located external to the ultrasonic transducer housing. In some embodiments, the system further includes an ultrasonic signal generator power supply adapted to supply electrical signals to drive the first ultrasonic transducer to transmit the first set of ultrasonic signals and to drive the second ultrasonic transducer to transmit the second set of ultrasonic signals.

Provided in some embodiments is an ultrasonic transducer system including: an ultrasonic transducer assembly adapted to be disposed in an interior region of an ultrasonic transducer housing. The ultrasonic transducer assembly including: a first ultrasonic transducer head adapted to transmit a first set of ultrasonic signals (the first ultrasonic transducer head including a first transmission surface and being adapted to direct the first set of ultrasonic signals through the first transmission surface); a second ultrasonic transducer head adapted to transmit a second set of ultrasonic signals (the second ultrasonic transducer head including a second transmission surface and being adapted to direct the second set of ultrasonic signals through the second transmission surface); and a transducer biasing member disposed between the first ultrasonic transducer head and the second ultrasonic transducer head. The transducer biasing member adapted to bias the first ultrasonic transducer and the second ultrasonic transducer in opposite directions to bias the first transmission surface of the first ultrasonic transducer against a first portion of an interior surface of the ultrasonic transducer housing and to bias the second transmission surface of the second ultrasonic transducer against a second portion of the interior surface of the ultrasonic transducer housing that is opposite the first portion of the interior surface of the ultrasonic transducer housing.

In some embodiments, the transducer biasing member includes a spring. In certain embodiments, the spring includes a coil spring. In some embodiments, the system further includes a second ultrasonic transducer assembly disposed in interior region of the ultrasonic transducer housing. The second ultrasonic transducer assembly including: a third ultrasonic transducer head adapted to transmit a third set of ultrasonic signals (the third ultrasonic transducer head including a third transmission surface and being adapted to direct the third set of ultrasonic signals through the third transmission surface); a fourth ultrasonic transducer head adapted to transmit a fourth set of ultrasonic signals (the fourth ultrasonic transducer head including a fourth transmission surface and being adapted to direct the fourth set of ultrasonic signals through the fourth transmission surface); and a second transducer biasing member disposed between the third ultrasonic transducer head and the fourth ultrasonic transducer head. The second transducer biasing member adapted to bias the third ultrasonic transducer and the fourth ultrasonic transducer in opposite directions to bias the third transmission surface of the third ultrasonic transducer against a third portion of the interior surface of the ultrasonic transducer housing and to bias the fourth transmission surface of the fourth ultrasonic transducer against a fourth portion of the interior surface of the ultrasonic transducer housing that is opposite from the third portion of the interior surface of the ultrasonic transducer housing). In certain embodiments, the first and second ultrasonic transducers are biased in opposite directions along a first axis, and the third and fourth ultrasonic transducers are biased in opposite directions along a second axis. In some embodiments, the first axis is angularly offset from the second axis. In certain embodiments, the first axis is angularly offset from the second axis by an angle of 90 degrees. In some embodiments, the first axis is linearly offset from the second axis. In certain embodiments, the first axis is parallel to the second axis.

BRIEF DESCRIPTION OF THE DRAWINGS

FIGS. 10A-10D are diagrams that illustrate an ultrasonic degassing unit in accordance with one or more embodiments.

Figure 1:
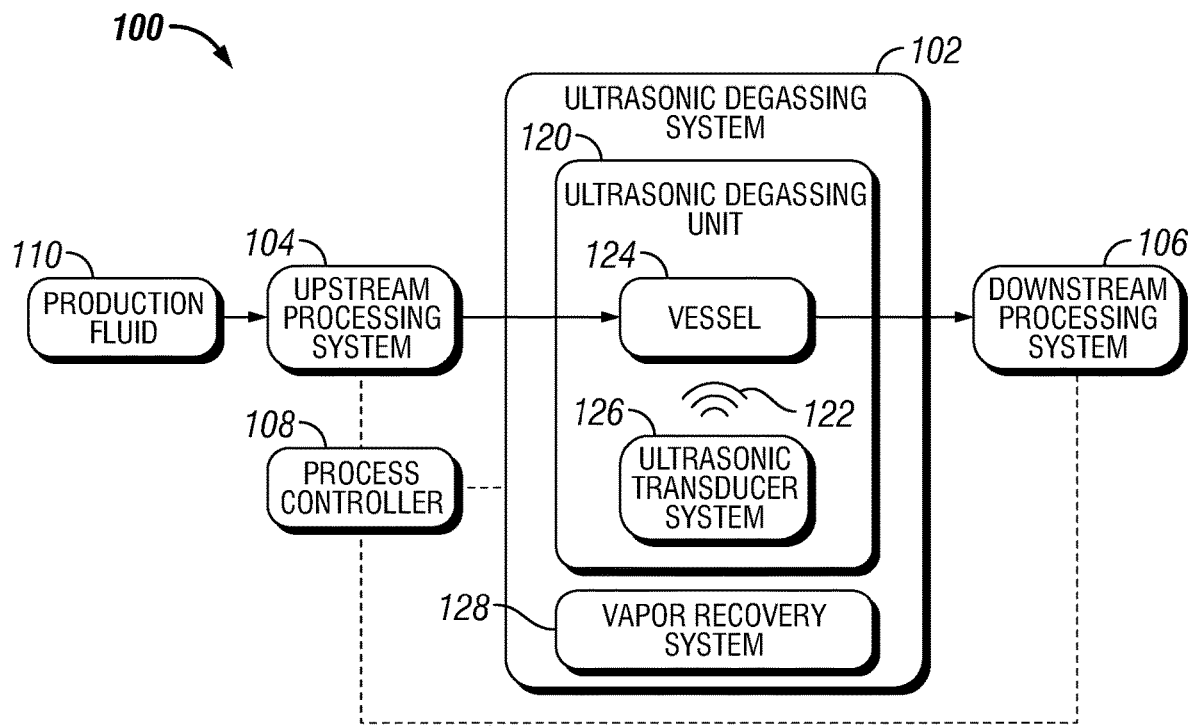
FIG. 1 is a diagram that illustrates a hydrocarbon production fluid processing environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of novel systems and methods for degassing hydrocarbon production fluid using ultrasonic signals. In some embodiments, an ultrasonic signal is introduced into production fluid including a hydrocarbon fluid mixture of a hydrocarbon liquid and gas entrained in the hydrocarbon liquid (or "entrained gas"), to facilitate the separation and removal of the entrained gas from the hydrocarbon liquid. In some embodiments, an ultrasonic hydrocarbon production fluid degassing system includes a hydrocarbon degassing unit, including a vessel (e.g., a vapor recovery vessel) that directs production fluid along a flowpath, and an ultrasonic transducer system that transmits ultrasonic signals into the production fluid as it travels along the flowpath. The ultrasonic signals cause the entrained gas to separate from the hydrocarbon liquid, and the gas is removed, for example, by way of a vapor recovery system (VRS).

In some embodiments, the ultrasonic signals have a frequency that is effective to cause the entrained gas to separate from the hydrocarbon liquid. For example, the ultrasonic signals may have a frequency in the range of about 20 kilohertz (kHz) to about 40 kHz, such as about 25 kHz. In some embodiments, the ultrasonic transducer system includes one or more ultrasonic transducer heads. For example, the ultrasonic transducer system may include multiple ultrasonic transducer heads that transmit respective subsets of the ultrasonic signals into the production fluid. Such a configuration can increase the exposure of the production fluid to ultrasonic signals, promoting the separation of the entrained gas from the production fluid.

In some embodiments, the ultrasonic transducer system includes one or more ultrasonic transducer units including ultrasonic transducer heads used to generate the ultrasonic signals. For example, the ultrasonic transducer system may include one more ultrasonic transducer units disposed in the flowpath of the production fluid, with each ultrasonic transducer unit including one or more ultrasonic transducer heads that generate the ultrasonic signals that are transmitted into the production fluid. In some embodiments, an ultrasonic transducer unit includes an ultrasonic transducer housing and one or more ultrasonic transducer heads disposed in the housing. For example, an ultrasonic transducer unit may include a cylindrical shaped housing having ultrasonic transducer heads disposed along a length of an interior of housing. The housing may be positioned to intersect the flowpath of the production fluid and, during use, the ultrasonic transducer heads can be activated to transmit ultrasonic signals through the wall of the housing, into the production fluid located around the exterior of the housing. In some embodiments, multiple ultrasonic transducer units are provided in the flowpath of the production fluid. For example, in the case of the vessel being a cylindrical vapor recovery vessel (VRV), such as a vapor recovery tower (VRT) having a flowpath that extends along a length of the interior of vessel, ultrasonic transducer units may be provided along the length of the interior of vessel. Such a configuration of the ultrasonic transducer system may provide for generating ultrasonic signals in a variety of locations, thereby increasing the exposure of the production fluid to ultrasonic signals and further promoting the separation of the entrained gas from the production fluid.

In some embodiments, an ultrasonic transducer unit includes one or more ultrasonic transducer assemblies. An ultrasonic transducer assembly may include one more ultrasonic transducer heads and a transducer biasing member that biases transmission surfaces of the one or more ultrasonic transducer heads into contact with the interior surface of the ultrasonic transducer housing. The resulting contact between the transmission surface of the ultrasonic transducer head and the interior surface of the housing may facilitate the transmission of the ultrasonic signals through the wall of the housing and into the production fluid located around the exterior of the housing.

In some embodiments, an ultrasonic transducer assembly includes two opposite facing ultrasonic transducer heads and a transducer biasing member that biases the transmission surfaces of the multiple ultrasonic transducer heads in opposite directions, into contact with the interior surface of the housing. For example, a transducer biasing member may be disposed between two transducer heads, and provide an outward biasing force to urge the two ultrasonic transducer heads and their respective transmission surfaces outward, in opposite directions from one another, and into contact with opposite portions of the interior surface of the housing. Thus, a single biasing member may operate to position two ultrasonic transducer heads within the housing. Moreover, such a biasing member may facilitate installation, repositioning, or removal of ultrasonic transducer heads. For example, the biasing member of an ultrasonic transducer assembly may be compressed to retract the ultrasonic transducer heads, enabling the ultrasonic transducer assembly (including the pair of ultrasonic transducer heads and the biasing member) to be installed into, repositioned within, or removed from the interior of the housing. The biasing member may be decompressed (or expanded) to bias the transmission surfaces of ultrasonic transducer heads into contact with the interior surface of the housing, securing the ultrasonic transducer assembly in place within the housing.

In some embodiments, multiple ultrasonic transducer assemblies are disposed inside the ultrasonic transducer housing. For example, multiple ultrasonic transducer assemblies may be disposed along a length of the interior of the housing, in series and linearly offset from one another. In some embodiments, the orientations of the ultrasonic transducer assemblies is varied. For example, adjacent ultrasonic transducer assemblies may be angularly offset from one another. In some instances, each of the transducer assemblies may be offset from adjacent transducer assemblies by an offset angle of 90°, such that a first ultrasonic transducer assembly is oriented an angle of 0°, a second ultrasonic transducer assembly (adjacent the first ultrasonic transducer assembly) is oriented an angle of 90°, a third ultrasonic transducer assembly (adjacent the second ultrasonic transducer assembly) is oriented an angle of 0°, and so forth. Such a configuration of the ultrasonic transducer unit may provide for generating the ultrasonic signals in a variety of locations and orientations, thereby increasing the exposure of the production fluid to ultrasonic signals to promote the separation of the entrained gas from the production fluid.

In some embodiments, a production fluid ultrasonic degassing system is employed in combination with other processing systems to further increase the effectiveness of the degassing and processing of the production fluid. For example, a production fluid processing system may include an ultrasonic degassing unit, a water separation system and a heater treater system. The water separation system may separate and remove water from the production fluid, and the ultrasonic production fluid degassing system and the heater treater system may work to separate and remove entrained gas from the production fluid. The ultrasonic production fluid degassing system may be employed at various locations and stages in the production fluid processing system. For example, the ultrasonic degassing unit may be a component of a well-site surface facility, that provides for separating and removing entrained gas from production fluid, upstream of a point of sale (POS) from a producer (e.g., a well operator) to a midstream entity (e.g., an oil and gas purchaser). The well-site surface facility may include, for example, a production fluid processing system including the ultrasonic production fluid degassing system, and a water separation system and a heater treater system located upstream of the ultrasonic degassing unit.

Although certain embodiments are described with regard to removing entrained gas from a hydrocarbon production fluid, embodiments can be applied in various context. For example, embodiments of the ultrasonic degassing system can be employed for separating gas from other fluids, such as separating entrained gas from refined fuels, detergents, or other liquids which are susceptible to or containing entrained gas.

FIG. 1 is a diagram that illustrates a hydrocarbon production fluid processing environment, including a hydrocarbon production fluid processing system ("hydrocarbon processing system") 100, in accordance with one or more embodiments. In the illustrated embodiment, the hydrocarbon processing system 100 includes an ultrasonic hydrocarbon production fluid degassing system ("ultrasonic degassing system") 102, an upstream hydrocarbon production fluid processing system ("upstream processing system") 104, a downstream hydrocarbon production fluid processing system ("downstream processing system") 106, and a process controller 108. As described, in some embodiments, the hydrocarbon processing system 100 is employed to process a hydrocarbon production fluid ("production fluid") 110.

In some embodiments, the production fluid 110 includes a hydrocarbon fluid mixture, including a hydrocarbon liquid and gas entrained in the hydrocarbon liquid. The hydrocarbon liquid may include, for example, crude oil and the gas may include, for example, natural gas. The production fluid 110 may include production fluid, such as mixture of produced oil, gas and water, provided from an outlet valve of a hydrocarbon well. In such an embodiment, the hydrocarbon processing system 100 may be a component of a well-site surface facilities, that provides for separating and removing entrained gas from the production fluid 110, upstream of a point of sale (POS) from a producer (e.g., a well operator) to a midstream entity (e.g., an oil and gas purchaser). In some embodiments, the hydrocarbon processing system 100 is a component of midstream or downstream facilities, for processing the production fluid 110 at various stages of distribution or use.

In some embodiments, the ultrasonic degassing system 102 employs ultrasonic signals to separate entrained gas from the production fluid 110. For example, if the production fluid 110 includes crude oil and natural gas entrained in the crude oil, the ultrasonic degassing system 102 may employ ultrasonic signals to separate the entrained natural gas from the crude oil. In some embodiments, the ultrasonic degassing system 102 includes one or more ultrasonic hydrocarbon degassing units ("ultrasonic degassing units") 120. An ultrasonic degassing unit 120 may operate to introduce ultrasonic signals 122 into the production fluid 110, to facilitate the separation of entrained gas from the production fluid 110. Continuing with the above example, an ultrasonic degassing unit 120 may introduce ultrasonic signals 122 into the production fluid 110, to cause the entrained natural gas to separate from the crude oil.

In some embodiments, an ultrasonic degassing unit 120 includes a vessel 124 and an ultrasonic transducer system 126. In some embodiments, the vessel 124 defines a flowpath of the production fluid 110, and the ultrasonic transducer system 126 operates to generate ultrasonic signals 122 that are transmitted into the production fluid 110 as it travels along the flowpath defined by the vessel 124. In some embodiments, the vessel 124 is a conduit, such as a pipe, tank, or a vapor recovery vessel (VRV), such as a vertically oriented vapor recover tower (VRT) of a vapor recovery system that directs the flow of the production fluid 110. For example, the vessel 124 may be VRT having an interior that defines a vertical flowpath of the production fluid 110, extending from an upper end of the VRT to a lower end of the VRT, and the ultrasonic transducer system 126 may generate ultrasonic signals 122 that are transmitted into the production fluid 110 located inside the VRT as it travels along the flowpath defined by the vessel 124.

The ultrasonic signals 122 may be generated with a sufficient frequency to cause entrained gas to separate from fluid of the production fluid 110. For example, the ultrasonic signals 122 may be of a sufficient frequency to cause entrained natural gas to separate from the crude oil of the production fluid 110. In some embodiments, the ultrasonic signals 122 have a frequency in the range of about 20 kilohertz (kHz) to about 40 kHz. In some embodiment, the ultrasonic signals 122 have a frequency in the range of about 23 kilohertz (kHz) to about 27 kHz. For example, the ultrasonic signals 122 may have a frequency of about 25 kHz. The radiating of the ultrasonic signals 122 into the production fluid 110 may create alternating high-pressure and low-pressure cycles at a rate corresponding to the frequency of the ultrasonic signals 122. The low-pressure cycle may create a vacuum that generates bubbles, which are filled with the entrained gas of the production fluid 110. These bubbles may rise to the surface of the production fluid 110, where they can be separated from the production fluid 110. In some embodiments, the ultrasonic degassing system 102 includes a vapor recovery system 128, and the separated gas is captured and removed by the vapor recovery system 128. The recovered gas may, for example, be sold, flared-off, or otherwise disposed of in a responsible and environmentally safe manner.

In some embodiments, the upstream processing system 104 operates to conduct pre-processing of the production fluid 110, upstream of the ultrasonic degassing system 102. Pre-processing of the production fluid 110 may refer to processing of the production fluid 110 that occurs prior to the production fluid 110 being subjected to the ultrasonic signals 122 of the ultrasonic degassing system 102. The upstream processing system 104 may include, for example, a water separator system, a heater treater system or a pressure reduction system. A water separator system may operate to separate and remove some or all of water contained in the production fluid 110, from the production fluid 110. A heater treater system may operate to heat the production fluid 110 to, for example, promote the separation of entrained gas from the production fluid 110. A pressure reduction system may operate to reduce the pressure of the production fluid 110 to, for example, promote the separation of entrained gas from the production fluid 110. In some embodiments, the upstream processing system 104 is a component of a well-site surface facility. For example, an inlet of the upstream processing system 104 may be coupled to an outlet of a production tree of a hydrocarbon well, and receive "raw" or "unprocessed" production fluid 110 (e.g., including a hydrocarbon fluid mixture of crude oil, water and natural gas) from the hydrocarbon well. Although the illustrated embodiment includes an upstream processing system 104, in some embodiments, the hydrocarbon processing system 100 does not include an upstream processing system. For example, the ultrasonic degassing system 102 may be coupled to an outlet of a production tree of a hydrocarbon well, and receive raw production fluid 110 from the hydrocarbon well without pre-processing.

In some embodiments, the downstream processing system 106 operates to conduct post-processing of the production fluid 110, downstream of the ultrasonic degassing system 102. Post-processing may refer to processing of the production fluid 110 subsequent to the production fluid 110 being subjected to the ultrasonic signals 122 of the ultrasonic degassing system 102. For example, post-processing may include processing of the "degassed" production fluid 110 exiting the ultrasonic degassing system 102. The downstream processing system 106 may include, for example, a water separator system, a heater treater system or a pressure reduction system. In some embodiments, the downstream processing system 106 is a component of a well-site surface facility. For example, an outlet of the downstream processing system 106 may be coupled to an outlet of well-site surface facilities that is coupled to a midstream facility, such as a storage facility (e.g., a storage tank), a valve for loading the production fluid onto a transport vehicle or a pipeline. Although the illustrated embodiment includes a downstream processing system 106, in some embodiments, the hydrocarbon processing system 100 does not include a downstream processing system. For example, an outlet of the ultrasonic degassing system 102 may be coupled to a midstream facility, such as a storage tank, a valve for loading the production fluid onto a transport vehicle, or a pipeline, and the degassed production fluid 110 processed by the ultrasonic degassing system 102 may be transported to the midstream facility, without further processing.

The production fluid 110 exiting a well, prior to undergoing processing at the surface may be referred to as "raw" or "unprocessed" production fluid 110. The production fluid 110 subjected to pre-processing of the upstream processing system 104 (e.g., prior to being subjected to degassing by the ultrasonic degassing system 102) may be referred to as "pre-processed" production fluid 110. The production fluid 110 subjected to the degassing of the ultrasonic degassing system 102 (e.g., the production fluid 110 from which the entrained gas has been separated and removed) may be referred to as "degassed" production fluid 110. The production fluid 110 subjected to the post-processing of the downstream processing system 106 may be referred to as "processed" production fluid 110.

In some embodiments, the processes controller 108 controls or monitors the processing of the production fluid 110. For example, the process controller 108 may include a controller that controls and monitors upstream processing performed by the upstream processing system 104, degassing performed by the ultrasonic degassing system 102, or downstream processing performed by the downstream processing system 106. In some embodiments, the process controller 150 includes a computer system similar to that of computer system 2000 described with regard to at least FIG. 12.

Figure 2:
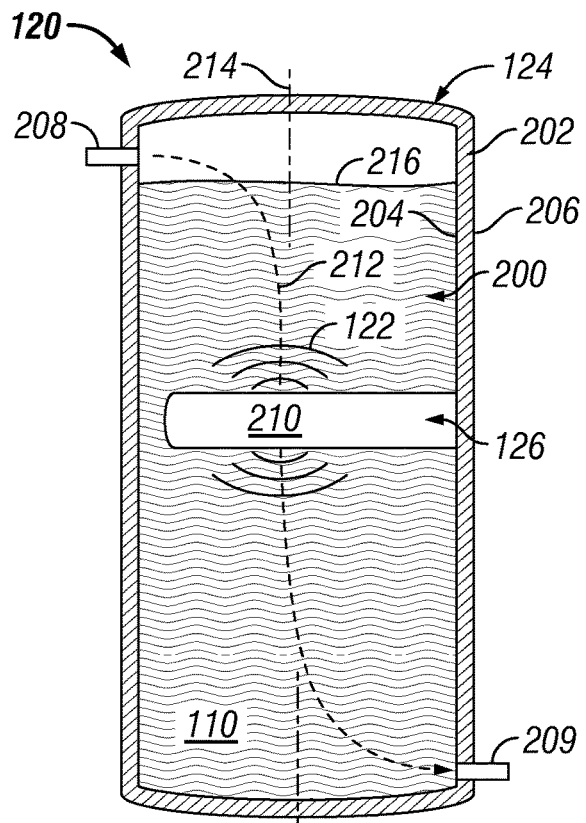
FIG. 2 is a diagram that illustrates a cross-sectioned side view of an ultrasonic degassing unit in accordance with one or more embodiments.

FIG. 2 is a diagram that illustrates a cross-sectioned side view of an ultrasonic degassing unit 120 in accordance with one or more embodiments. In the illustrated embodiment, the ultrasonic degassing unit 120 includes a vessel 124 and an ultrasonic transducer system 126. The vessel 124 includes a body 202 having an interior surface 204 and an exterior surface 206, and an inlet 208 and an outlet 209. In some embodiments, the inlet 208 is coupled to an outlet of an upstream system. For example, the inlet 208 may be coupled to an outlet of the upstream processing system 104, and route pre-processed production fluid 110 from the upstream processing system 104, into the interior 200 of the vessel 124. As a further example, the inlet 208 may be coupled to an outlet of a production tree of a hydrocarbon well, and receive unprocessed production fluid 110 from the hydrocarbon well, such as a hydrocarbon fluid mixture of crude oil, water and natural gas. In some embodiments, the outlet 209 is coupled to an inlet of a downstream system. For example, the outlet 209 may be coupled to an inlet of the downstream processing system 106, and route degassed production fluid 110 from the interior 200 of the vessel 124, to the downstream processing system 106. As a further example, the outlet 209 may be coupled to a midstream facility, such as a storage tank, a valve for loading the production fluid onto a transport vehicle, or a pipeline, and route the degassed production fluid 110 from the interior 200 of the vessel 124 to the midstream facility. In some embodiments, the vessel 124 is a pressure reduction apparatus that operates to reduce the pressure of the production fluid 110 to, for example, promote the separation of entrained gas from the production fluid 110. For example, the vessel 124 may include a vapor recovery vessel (VRV), such as a vapor recover tower (VRT), in which the pressure of the production fluid 110 is rapidly reduced to flash gas from the production fluid 110. The flash may occur in parallel with the introduction of ultrasonic signals 122 into the production fluid 110 (e.g., both occurring inside the vessel 124) to promote the separation of the gas from the production fluid 110.

The interior surface 204 of the body 202 of the vessel 124 may defines the interior region ("interior") 200 that defines a flowpath 212 of the production fluid 110, through the vessel 124. For example, the flowpath 212 may extend from the inlet 208, through the interior 200, to the outlet 209. Fluid in the interior 200 of the vessel 124 may be considered to be in the flowpath 212. In some embodiments, the vessel 124 includes an elongated body 202 having a longitudinal axis 214, and some or all of the flowpath 212 runs generally parallel to the longitudinal axis 214 of the body 202. For example, the vessel 124 may include a vapor recover tower (VRT) having a vertically oriented cylindrical body 202 having a vertically oriented longitudinal axis 214, an inlet 208 at an upper end of the body 202, an outlet at a lower end of the body 202, and the flowpath 212 may extend from the inlet 208, through the interior 200, to the outlet 209, along a flowpath 212 generally parallel to the vertically oriented longitudinal axis 214. In some embodiments, the vapor recovery system 128 includes a conduit in fluid communication with an upper end or other portion of the interior 200 of the vessel 124 in which separated gas collects, and the vapor recovery system 128 removes the separated gas by way of the conduit.

In some embodiments, during operation, production fluid 110 enters the interior 200 of the vessel 124 by way of the inlet 208, travels through the interior of the vessel 124 along the flowpath 212, and eventually exits the interior 200 of the vessel 124 by way of the outlet 209. As the production fluid 110 travels along the flowpath 212, it may flow or otherwise be located around an ultrasonic transducer system 126 located in the flowpath 212, and be subjected to ultrasonic signals 122 generated by the ultrasonic transducer system 126. In some embodiments, a volume of the production fluid 110 is maintained in the interior 200 of the vessel 124, as indicated by the production fluid level 216. In some embodiments, the ultrasonic transducer system 126 is disposed below the production fluid level 216, to transmit the ultrasonic signals 122 into the volume of production fluid 110 below production fluid level 216. The duration for which production fluid 110 is held in the interior 200 of the vessel 124, and thus in the flowpath 212 and near the ultrasonic transducer system 126, may be controlled by controlling a flow rate of the production fluid 110 entering or exiting the vessel 124. For example, in an embodiment in which the production fluid 110 exits the vessel 124 at about the same rate as it enters the vessel 124, the flow rate of production fluid 110 may be increased to decrease the amount of time that the production fluid 110 is held in the interior 200 of the vessel 124, or be decreased to increase the amount of time that the production fluid 110 is held in the interior 200 of the vessel 124. Increasing the duration the production fluid 110 is held in the interior 200 of the vessel 124 may increase the exposure of the production fluid 110 to the ultrasonic signals 122 transmitted by the ultrasonic transducer system 126. In some embodiments, the flow rate is controlled to expose the production fluid 110 to ultrasonic signals for about 1-10 minutes (e.g., about 3-4 minutes on average), as it travels through the vessel 124.

In some embodiments, an ultrasonic transducer system 126 includes one or more ultrasonic transducer units 210. The one or more ultrasonic transducer units 210 may be operated to generate the ultrasonic signals 122 transmitted by ultrasonic transducer system 126. For example, the ultrasonic transducer system 126 of FIG. 2 may include one or more ultrasonic transducer units 210 that are operated to generate the ultrasonic signals 122 that are transmitted into the production fluid 110 as it travels through the interior 200 of the vessel 124, along the flowpath 212 and around the ultrasonic transducer system 126. In some embodiments, the one or more ultrasonic transducer units 210 are disposed in the interior 200 of the vessel 124. For example, one or more ultrasonic transducer units 210 may be disposed in the interior 200, below the production fluid level 216, such that they transmit the ultrasonic signals 122 into the volume of production fluid 110 below production fluid level 216.

Figure 3:
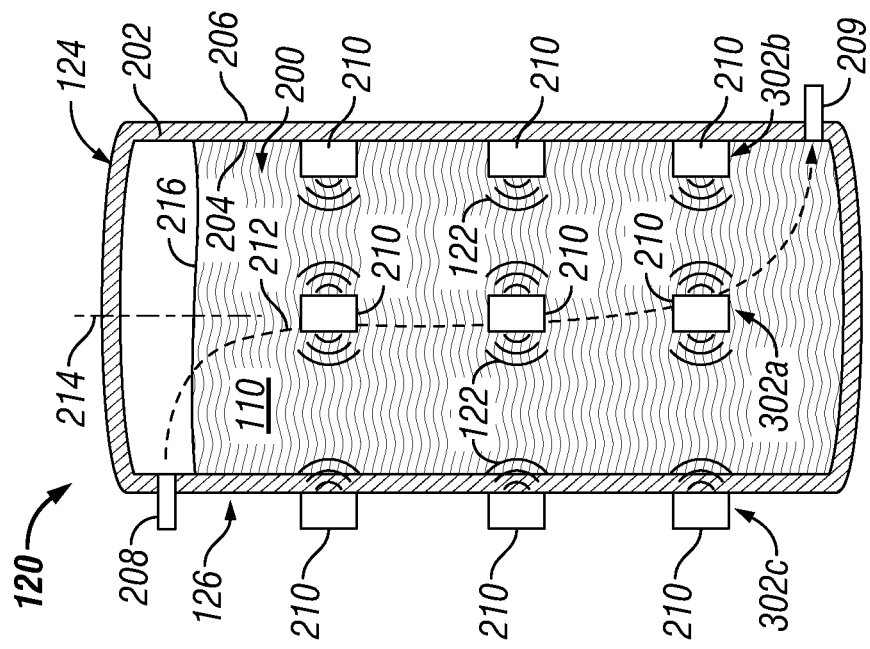
FIG. 3 is a diagram that illustrates a cross-sectioned side view of an ultrasonic degassing unit including ultrasonic transducer units positioned in various locations accordance with one or more embodiments.

In some embodiments, the ultrasonic transducer system 126 includes one or more ultrasonic transducer units 210 suspended in the interior 200 of the vessel 124, one or more ultrasonic transducer units 210 extending from the interior surface 204 of the vessel 124, or one or more ultrasonic transducer units 210 disposed on the exterior surface 206 of the vessel 124. FIG. 3 is a diagram that illustrates a cross-sectioned side view of an ultrasonic degassing unit 120 including an ultrasonic transducer system 126 that having ultrasonic transducer units 210 positioned in various locations accordance with one or more embodiments. In the illustrated embodiment, the ultrasonic transducer system 126 includes a first set of ultrasonic transducer units 302a suspended in the interior 200 of the vessel 124, in the flowpath 212 of the production fluid 110 and below the production fluid level 216. The first set of ultrasonic transducer units 302a may be suspended by a hanging element, such as a cable 304). The ultrasonic transducer system 126 also includes a second set of ultrasonic transducer units 302b disposed on and extending laterally from the interior surface 204 of the vessel 124, in the flowpath 212 of the production fluid 110 and below the production fluid level 216. The ultrasonic transducer system 126 further includes a third set of ultrasonic transducer units 302c disposed on the exterior surface 206 of the vessel 124, below the production fluid level 216. In such an embodiment, during operation, the ultrasonic transducer units 210 of the first and second ultrasonic transducer units 302a and 302b may transmit ultrasonic signals 122 directly into the production fluid 110 as it travels along the flowpath 212 and around the respective ultrasonic transducer units 210. Further, the ultrasonic transducer units 210 of the third set of ultrasonic transducer units 302c may transmit ultrasonic signals 122 through the wall of the body 202 of the vessel 124, into the production fluid 110 as it travels along the flowpath 212 and near the respective ultrasonic transducer units 210. Although the illustrated embodiment includes ultrasonic transducer units 210 suspended in the interior 200 of the vessel 124, disposed on and extending laterally from the interior surface 204 of the vessel 124, and disposed on the exterior surface 206 of the vessel 124, any combination of suitable positions and patterns of the ultrasonic transducer units 210 can be employed. Such embodiments may increase the number and coverage of the ultrasonic signals 122, thereby increasing the exposure of the production fluid 110 to the ultrasonic signals 122 and further promoting the separation of the entrained gas from the production fluid 110.

In some embodiments, the ultrasonic transducer system 126 includes a plurality of ultrasonic transducer units 210 disposed in a liner pattern about the vessel 124. For example, the plurality of ultrasonic transducer units 210 may be disposed along a length of an interior or exterior of the vessel 124 in a linear pattern, extending parallel to the longitudinal axis 214 of the vessel 124, as illustrated in FIG. 3. Although a single line is depicted for the purpose of illustration, the pattern may include a single line or multiple lines of ultrasonic transducer units 210. For example, the ultrasonic transducer units 210 may include four lines of ultrasonic transducer units 210 disposed on the interior surface 204 or the exterior surface 206, angularly offset by an angle of 90 degrees about the longitudinal axis 214.

Figure 4:
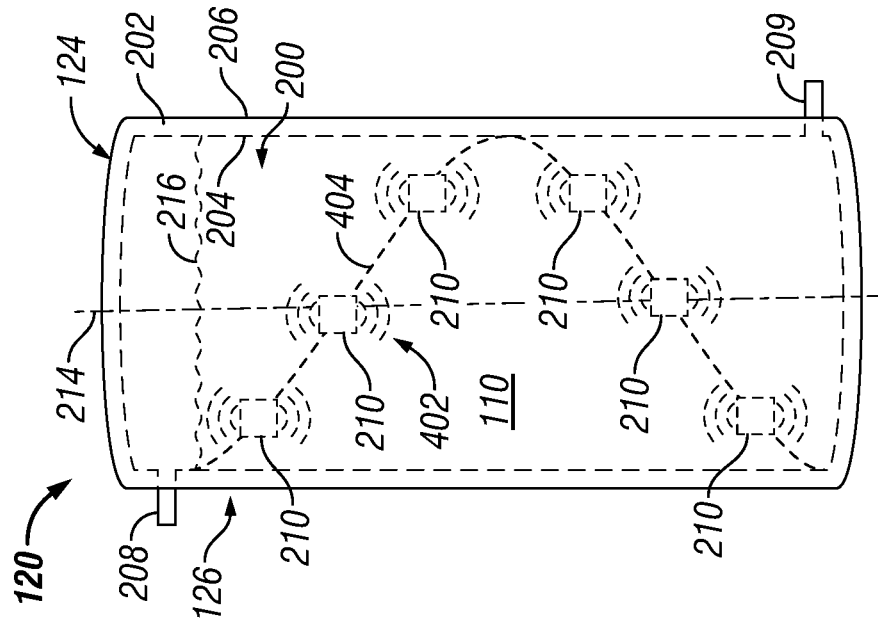
FIG. 4 is a diagram that illustrates a set of ultrasonic transducer units positioned in a helical pattern in accordance with one or more embodiments.

In some embodiments, the ultrasonic transducer system 126 includes a plurality of ultrasonic transducer units 210 positioned in a non-linear pattern about the vessel 124. For example, the plurality of ultrasonic transducer units 210 may be positioned in a helical pattern defined by ultrasonic transducer units 210 disposed along a helical path, extending around the longitudinal axis of the vessel 124. FIG. 4 is a diagram that illustrates a side view of a set of ultrasonic transducer units 402 positioned in a helical pattern in accordance with one or more embodiments. In the illustrated embodiments, the ultrasonic transducer units 210 of the set of ultrasonic transducer units 402 are disposed along a helical path 404 spiraling around the longitudinal axis 214 and along a length of the interior surface 204 of the vessel 124. In some embodiments, the helical path may extend a partial revolution, a complete revolution or multiple revolutions, around the longitudinal axis 214 of the vessel 124. For example, an ultrasonic transducer system 126 may include eleven ultrasonic transducer unit 210, each angularly offset by about 36 degrees from an adjacent ultrasonic transducer unit 210 and linearly offset by about 1 meter (m) from the adjacent ultrasonic transducer unit(s) 210, such that the helical path 404 and pattern of ultrasonic transducer units 210 includes one complete turn about the longitudinal axis of the vessel 124, and spans a distance of about 10 m along the length of the vessel 124. Such patterning can be used to promote directional flow of the production fluid inside the vessel 124. For example, the plurality of ultrasonic transducer units 210 disposed in a helical pattern about the vessel 124 may cause the production fluid 110 to spiral (or "roll") about the longitudinal axis 214 within the vessel 124. The additional movement can further cause the different portions of the production fluid 110 to move toward and near the ultrasonic transducer units 210, thereby increasing the exposure of the production fluid 110 to ultrasonic signals 122 and further promoting the separation of the entrained gas from the production fluid 110. Although the illustrated embodiment depicts ultrasonic transducer units 210 disposed on the interior of the vessel 124 for the purpose of illustration, embodiments can include ultrasonic transducer units 210 suspended in a helical pattern, or disposed on the exterior surface 206 of the vessel 124 in a helical pattern.

Figure 5:
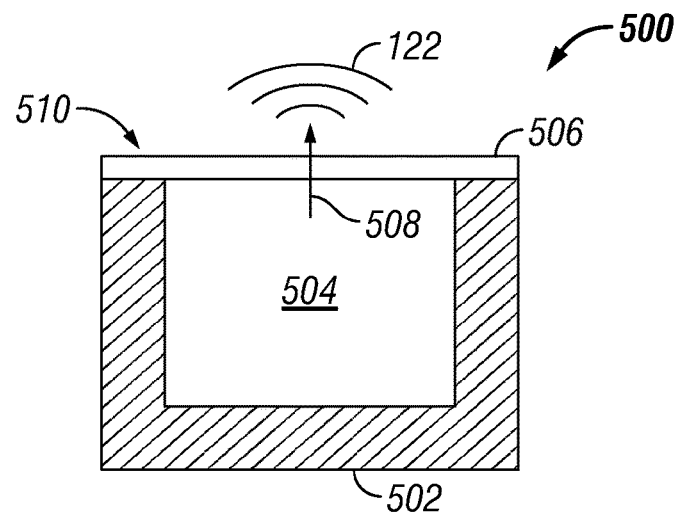
FIG. 5 is a diagram that illustrates a cross-sectioned side view of an example ultrasonic transducer head in accordance with one or more embodiments.

In some embodiments, an ultrasonic transducer unit 210 includes one or more ultrasonic transducer heads. An ultrasonic transducer head may include an acoustic device that is operable to generate ultrasonic acoustic signals, such as ultrasonic signals 122. FIG. 5 is a diagram that illustrates a cross-sectioned side view of an example ultrasonic transducer head 500 in accordance with one or more embodiments. In the illustrated embodiment, the transducer head 500 includes a body 502, an acoustic signal source 504 and a nose (or "cover") 506.

In some embodiments, the body 502 is a housing that at least partially encapsulates the acoustic signal source 504, to protect and insulate the acoustic signal source 504. For example, the body 502 may include an acoustic insulator having a metal outer casing and defining an interior region inside of which the acoustic signal source 504 is disposed. In some embodiments, the acoustic insulator of the body 502 inhibits ultrasonic signals 122 generated by the acoustic signal source 504 from passing through the body 502, and, as a result, directs the ultrasonic signals 122 generated by the acoustic signal source 504 through the nose 506 (as indicated by arrow 508).

In some embodiments, the acoustic signal source 504 includes a device that generates ultrasonic signals 122 in response to being driven by a corresponding source signal. For example, the acoustic signal source 504 may include a piezoelectric crystal. During operation, the piezoelectric crystal may be driven by an alternating current (AC) voltage of a given frequency, causing the piezoelectric crystal to generate acoustic signals of the given frequency. In some embodiments, the frequency of the AC voltage source signal is of a sufficient frequency to generate the ultrasonic signals 122. For example, the frequency of the AC voltage source signal may be equal to or greater than about 20 kHz. In accordance with some embodiments, the source signal may include an AC voltage of a frequency in the range of about 20 kHz to about 40 kHz or in the range of about 23 kilohertz (kHz) to about 27 kHz, such as about 25 kHz, which causes the piezoelectric crystal to generate corresponding ultrasonic signals 122 having a frequency that corresponds to the source signal. In some embodiments, the ultrasonic transducer system 126 includes an ultrasonic source signal generator that generates the ultrasonic source signal used to drive the acoustic signal source 504 of the ultrasonic transducer head 500. For example, the ultrasonic transducer system 126 may include an ultrasonic generator that includes an AC voltage source that can be controlled to generate an AC voltage having the desired ultrasonic frequency (e.g., about 20 kHz to about 40 kHz), and that is routed to the acoustic signal source 504 of the ultrasonic transducer head 500.

In some embodiments, the nose 506 includes a protective cover disposed over the acoustic signal source 504 that encapsulates the acoustic signal source 504 in the body 502 and that is capable of transmitting ultrasonic signals 122 generated by the acoustic signal source 504. For example, the nose 506 may be a metal or plastic cover disposed over the acoustic signal source 504 to enclose the acoustic signal source 504 in the body 502. During operation, the ultrasonic signals 122 generated by the acoustic signal source 504 may be transmitted through the nose 506 and into the environment surrounding the ultrasonic transducer head 500, in a transmission direction (as indicated by arrow 508). A transmission surface 510 of an ultrasonic transducer head 500 may be defined as a surface on an exterior of the ultrasonic transducer head 500 from which the ultrasonic signals 122 generated by the ultrasonic transducer head 500 are transmitted. For example, the transmission surface 510 of the ultrasonic transducer head 500 may be the exterior surface of the nose 506, from which the ultrasonic signals 122 are transmitted.

In some embodiments, an ultrasonic transducer unit 210 includes a housing and one or more ultrasonic transducer heads 500 disposed in the housing. During use, the housing may position the ultrasonic transducer heads 500 in close proximity to the production fluid 110, while isolating the ultrasonic transducer heads 500 from the surrounding environment. Such a housing can be especially important for protecting transducer heads where the ultrasonic transducer unit 210 is exposed to harsh environmental conditions, such as being submersed in the production fluid 110, or being exposed to the environment surrounding the vessel 124.

Figure 6:
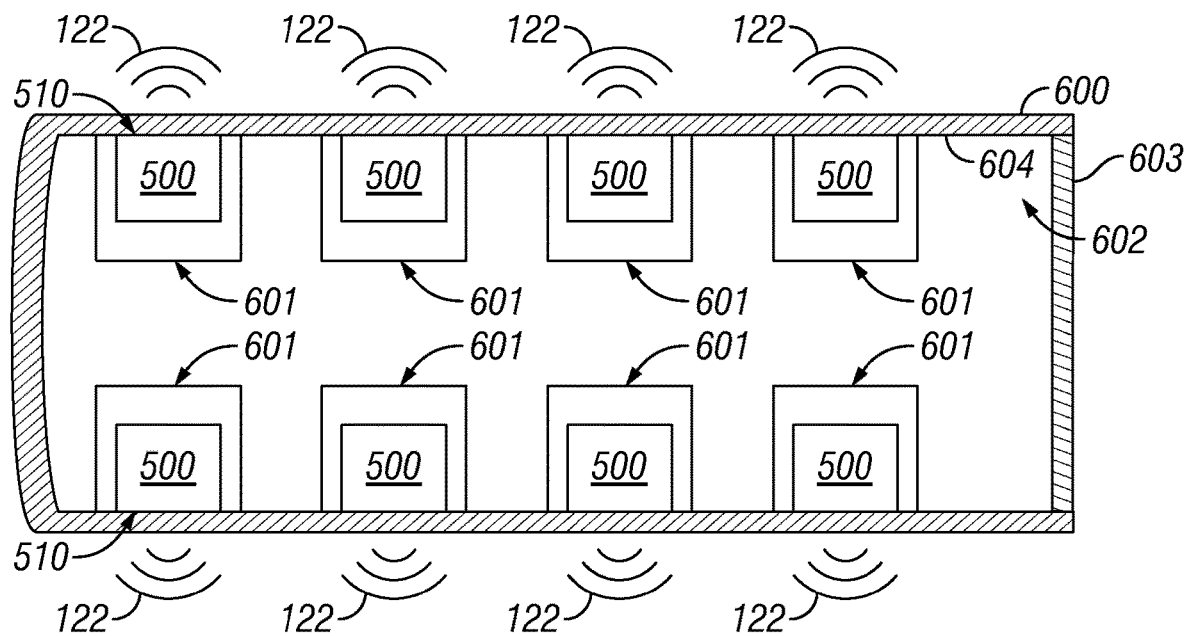
FIG. 6 is a diagram that illustrates a cross-sectioned side view of an ultrasonic transducer unit in accordance with one or more embodiments.

FIG. 6 is a diagram that illustrates a cross-sectioned side view of an ultrasonic transducer unit 210 in accordance with one or more embodiments. In the illustrated embodiment, the ultrasonic transducer unit 210 includes a housing 600 and a plurality of ultrasonic transducer assemblies 601 disposed in an interior 602 of the housing 600. In some embodiments, the housing 600 includes a hollow cylindrical tube, defining a cylindrically shaped interior 602. In some embodiments, the housing 600 includes an access panel 603. The access panel 603 may be installed (or "closed") to seal-off or otherwise isolate the interior 602 of the housing 600 and the ultrasonic transducer assemblies 601 from the surrounding environment. The access panel 603 may be uninstalled (or "opened") to provide access to the interior 602 of the housing 600. This can provide access to the interior 602 of the housing 600 to, for example, install, reposition or remove the ultrasonic transducer assemblies 601 in the interior 602 of the housing 600. In some embodiments, each of the ultrasonic transducer assemblies 601 includes one or more ultrasonic transducer heads 500. The transmission surface 510 of each of the ultrasonic transducer heads 500 may abut an interior surface 604 of the housing 600. During operation, the ultrasonic signals 122 generated by the ultrasonic transducer heads 500 may be transmitted from the transmission surface 510 of the ultrasonic transducer heads 500, through an adjacent portion of the housing 600, and into an adjacent portion of the environment surrounding the housing 600.

In some embodiments, the ultrasonic transducer assemblies 601 are adhered to the interior surface 604 of the housing 600. For example, the transmission surfaces 510 of the ultrasonic transducer heads 500 may be adhered to the interior surface 604 of the housing 600 using an adhesive, such as an epoxy adhesive. Such adhesion may provide acoustic coupling between the transmission surface 510 and the interior surface 604 of the housing 600 that facilitates the transmission of the ultrasonic signals 122 into and through the walls of the housing 600. In some embodiments, the ultrasonic transducer heads 500 are biased against the interior surface 604 of the housing 600. For example, each of the ultrasonic transducer assemblies 601 may include a biasing member positioned to exert a biasing force on the one or more ultrasonic transducer heads 500 of the ultrasonic transducer assembly 601, to urge the transmission surface 510 of the one or more ultrasonic transducer heads 500 of the ultrasonic transducer assembly 601 into contact, or otherwise against, the interior surface 604 of the housing 600. In some embodiments, the interface between the transmission surface 510 of the ultrasonic transducer head 500 and the interior surface 604 of the housing 600 is further adapted to facilitate the transmission of the ultrasonic signals 122. For example, in the case where the transmission surface 510 of the ultrasonic transducer head 500 is not adhered to the interior surface 604 of the housing 600 using an adhesive, a transmission substance, such as a gel, may be disposed between the transmission surface 510 of the ultrasonic transducer head 500 and the interior surface 604 of the housing 600, to further promote contact and acoustic coupling between the transmission surface 510 and the interior surface 604.

In some embodiments, an ultrasonic transducer assembly 601 includes a plurality of ultrasonic transducer heads 500. For example, an ultrasonic transducer assembly 601 may include a biasing member disposed between a pair of ultrasonic transducer heads 500. The biasing member may provide an outward biasing force to urge the two ultrasonic transducer heads 500 outward, in opposite directions from one another. The biasing force may urge the respective transmission surfaces 510 of the pair of ultrasonic transducer heads 500 into contact with opposite portions of the interior surface 604 of the housing 600. In such an embodiment, the ultrasonic transducer heads 500 may be operated to transmit ultrasonic signals 122 in opposite directions.

Figure 7A:
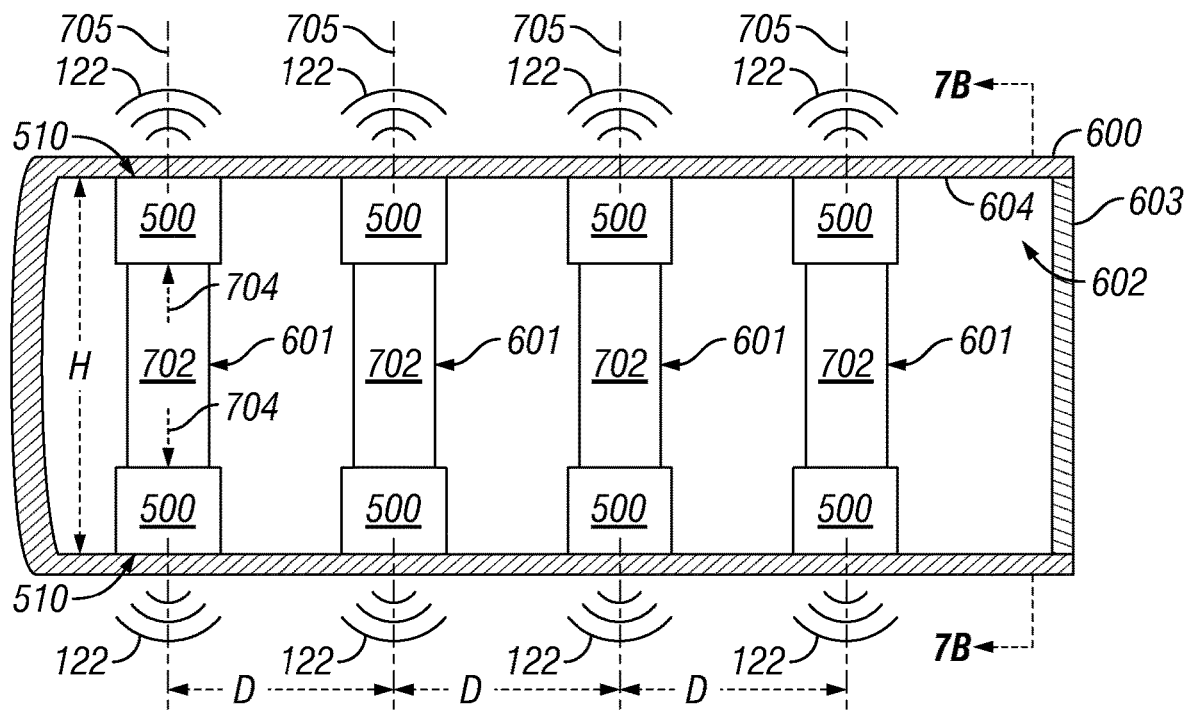
FIGS. 7A, 7B, 8A and 8B are diagrams that illustrate ultrasonic transducer units including ultrasonic transducer assemblies that each include a plurality of ultrasonic transducer heads in accordance with one or more embodiments.
Figure 7B:
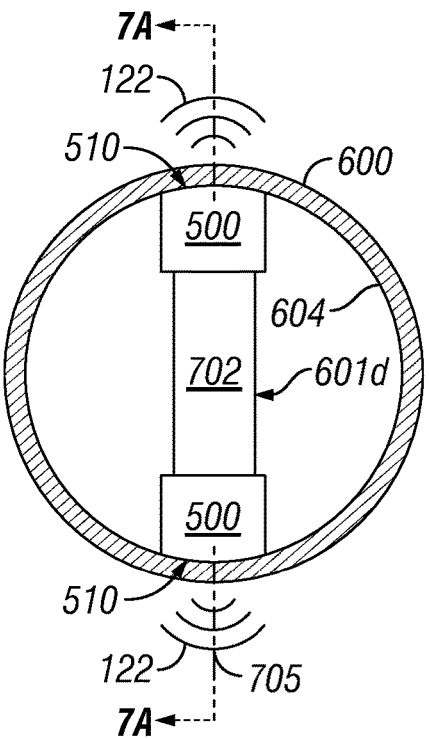

FIGS. 7A and 7B are diagrams that illustrate cross-sectioned side and end views, respectively, of an example an ultrasonic transducer unit 210 including ultrasonic transducer assemblies 601 that each include a plurality of ultrasonic transducer heads 500 in accordance with one or more embodiments. In the illustrated embodiment, each of the ultrasonic transducer assemblies 601 includes a biasing member 702 disposed between a pair of ultrasonic transducer heads 500. The biasing member 702 may include a compressive spring, such as a compressive coil spring, a compressive rubber or urethane block spring, or the like. When the biasing member 702 is at least partially compressed, the biasing member 702 may provide outward biasing force (indicated by arrows 704) that urges the two ultrasonic transducer heads 500 outward, in opposite directions from one another (in the direction of arrows 704). In such an embodiment, the ultrasonic transducer heads 500 can be operated to transmit respective sets of ultrasonic signals 122 in opposite directions, through opposite portions of the housing 600. The sets of ultrasonic signals 122 for an ultrasonic transducer assembly 601 may be generated in opposite directions, and parallel to an axis 705 of the transducer head assembly. When the ultrasonic transducer assembly 601 is installed in the interior 602 of the housing 600, the biasing force may urge the respective transmission surfaces 510 of the ultrasonic transducer heads 500 in to contact with opposite portions of the interior surface 604 of the housing 600. Such an embodiment may provide contact between each transmission surface 510 and the interior surface 604 of the housing 600, to promote acoustic coupling between the transmission surface 510 and the interior surface 604 of the housing 600 that facilitates the transmission of the ultrasonic signals 122 into and through the housing 600. In some embodiments, the biasing member 702 is employed without adhering the ultrasonic transducer head 500 to the interior surface 604 of the housing 600. For example, the biasing member 702 may be positioned to exert a biasing force on the body 502 of the ultrasonic transducer head 500 to urge the transmission surface 510 of the ultrasonic transducer head 500 against the interior surface 604 of the housing 600, without the use of an adhesive between the transmission surface 510 of the ultrasonic transducer head 500 and the interior surface 604 of the housing 600. Such an embodiment may promote contact between the transmission surface 510 and the interior surface 604 of the housing 600 that provides acoustic coupling between the transmission surface 510 and the interior surface 604 of the housing 600 that facilitates the transmission of the ultrasonic signals 122 into and through the housing 600, while enabling the transmission surface 510 to disengage from contact with the interior surface 604 of the housing 600 without having to break an adhesive bond between the transmission surface 510 and the interior surface 604 of the housing 600. This can be particularly useful for installing, repositioning, or removing the ultrasonic transducer assemblies 601 and the ultrasonic transducer heads 500 in the housing 600.

In some embodiments, the ultrasonic transducer assembly 601 can be adjusted between a retracted state and an expanded state. In the retracted state, the biasing member 702 may be compressed to reduce an overall height (H) of the ultrasonic transducer assembly 601. The overall height (H) of the ultrasonic transducer assembly 601 may, for example, be less than a height (e.g., an interior diameter) of the interior 602 of the housing 600. In such an embodiment, the ultrasonic transducer assembly 601 may be maintained in the retracted state while the ultrasonic transducer assembly 601 is moved into, out of, or within the interior 602 of the housing 600. Once the ultrasonic transducer assembly 601 is located at an installation location within the interior 602 of the housing 600, the biasing member 702 may be released or otherwise decompressed to place the ultrasonic transducer assembly 601 in the expanded state, which in turn biases the transmission surfaces 510 of the ultrasonic transducer assembly 601 into engagement with the respective portions of the interior surface 604 of the housing 600, to secure the ultrasonic transducer assembly 601 in the installation location.

In some embodiments, the ultrasonic transducer assemblies 601 are installed in series along a length of the interior 602 of the housing 600, linearly offset from one another by a given distance (D) (e.g., 0.25 meters (m)). In some embodiments, the plurality of ultrasonic transducer assemblies 601 have the same or different orientations. Such embodiments may increase the number and coverage of the ultrasonic signals 122, thereby increasing the exposure of the production fluid 110 to the ultrasonic signals 122 and promoting the separation of the entrained gas from the production fluid 110 around the ultrasonic transducer unit 210.

The ultrasonic transducer unit 210 of FIGS. 7A and 7B includes a plurality of ultrasonic transducer assemblies 601 having the same orientation in accordance with one or more embodiments. In the illustrated embodiment, the four ultrasonic transducer assemblies 601 are installed in series along a length of the interior 602 of the housing 600, are linearly offset from one another by an offset distance (D) (e.g., 0.25 m), and are all arranged in the same orientation. In such an embodiment, the ultrasonic transducer assemblies 601 may generate respective sets of ultrasonic signals 122 in the same orientations, at locations offset from one another by the offset distance (D). For example, with each of the ultrasonic transducer assemblies 601 including "dual-opposing" ultrasonic transducer heads 500, each of the ultrasonic transducer assemblies 601 may generate a first set of ultrasonic signals 122 in a first direction (as indicated by the upward ultrasonic signals 122 in FIGS. 7A and 7B, parallel to the axis 705), and may generate a second set of ultrasonic signals 122 in a second direction, opposite from the first direction (e.g., angularly offset by 180 degrees from the first direction) (as indicated by the downward ultrasonic signals 122 in FIGS. 7A and 7B, parallel to the axis 705).

Figure 8A:
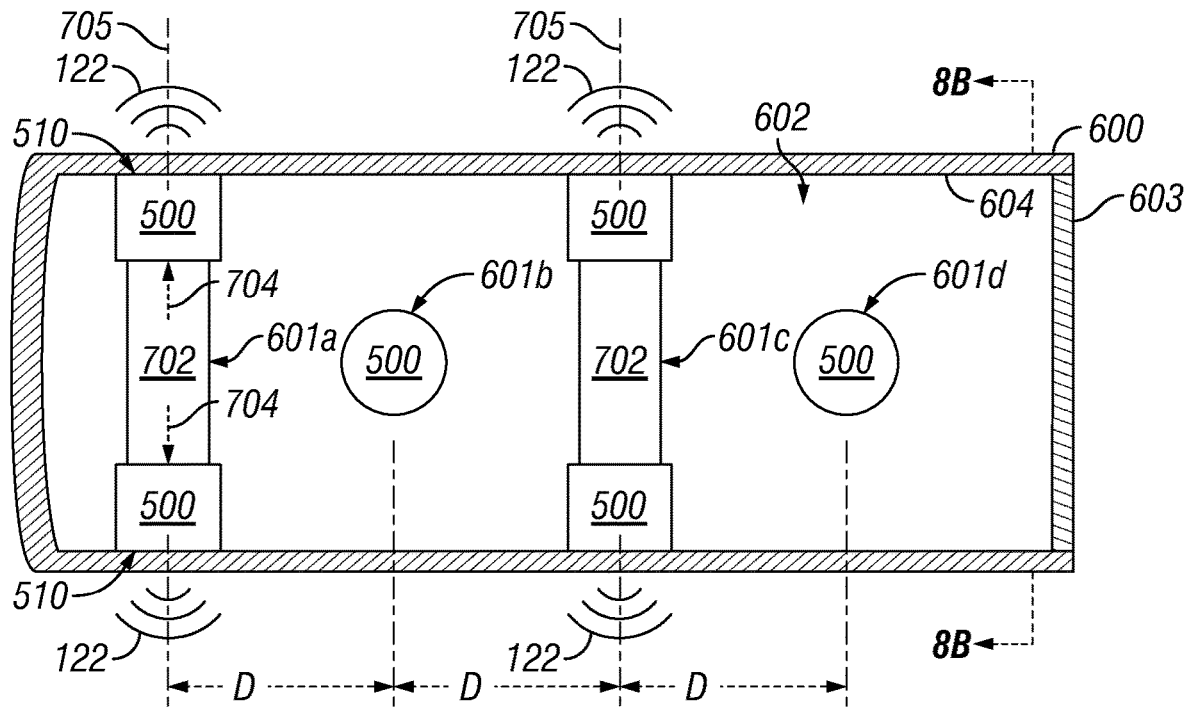
Figure 8B:
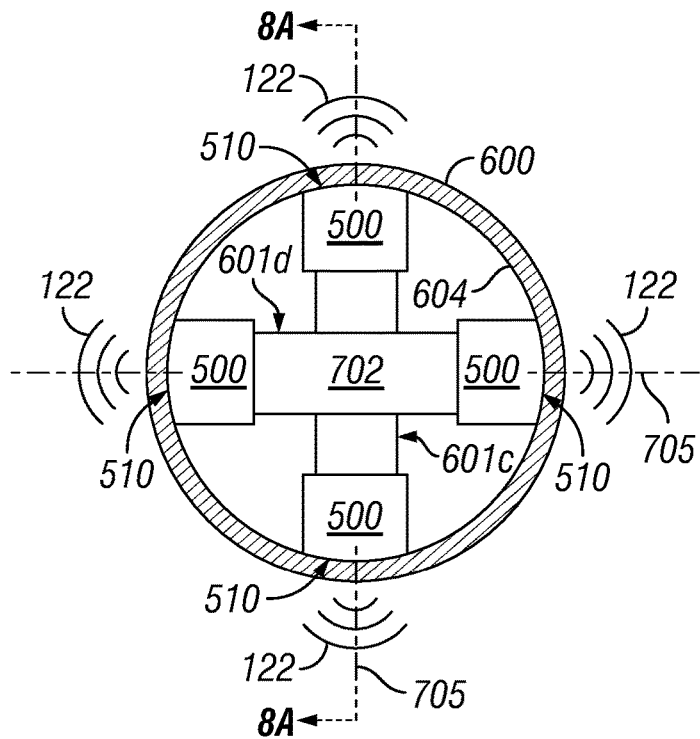

FIGS. 8A and 8B are diagrams that illustrates cross-sectioned side and end views, respectively, of an ultrasonic transducer unit 210 including a plurality of ultrasonic transducer assemblies 601 (e.g., ultrasonic transducer assemblies 601a, 601b, 601c and 601d) having different orientations in accordance with one or more embodiments. In the illustrated embodiment, the four ultrasonic transducer assemblies 601a, 601b, 601c and 601d are installed in series along a length of the interior 602 of the housing 600, are linearly offset from one another by an offset distance (D) (e.g., 0.25 m), and are arranged in different orientations. For example, in the illustrated embodiment each of the ultrasonic transducer assemblies 601a, 601b, 601c and 601d are oriented at an angular offset of about 90 degrees relative to an adjacent ultrasonic transducer assembly. For example, the axis 705 of each of the ultrasonic transducer assemblies 601a and 601c may have an orientation of 0 degrees, and the axis 705 of each of the ultrasonic transducer assembly 601b and 601d may have an orientation of 90 degrees. In such an embodiment, the ultrasonic transducer assemblies 601a, 601b, 601c and 601d may generate ultrasonic signals 122 in different orientations, at locations offset from one another by the offset distance (D). For example, with each of the ultrasonic transducer assemblies 601a, 601b, 601c and 601d including "dual-opposing" ultrasonic transducer heads 500, the ultrasonic transducer assemblies 601a and 601c may each generate ultrasonic signals 122 in opposite directions along a first orientation, and the ultrasonic transducer assemblies 601b and 601d may each generate ultrasonic signals 122 in opposite directions along a second orientation offset from the first orientation by 90 degrees.

Although embodiments are described with regard to four ultrasonic transducer assemblies, a liner offset distance of about 0.25 m and angular offsets of about 90 degrees for the purpose of illustration, embodiments can include any suitable number of ultrasonic transducer assemblies 601, other offset distances and other angular offsets. For example, an ultrasonic transducer unit 210 can include any number of ultrasonic transducer assemblies 601, the ultrasonic transducer assemblies 601 can be linearly offset from one another by a suitable distance (e.g., in the range of about 0.1 m to 10 m), and can be angularly offset from one another by a suitable offset angle (e.g., in the range of about 1 degree to 180 degrees).

In some embodiments, an ultrasonic degassing system 102 includes elongated ultrasonic transducer units 210 that are oriented to protrude into the interior 200 of the vessel 124, to intersect the production fluid 110 in the flowpath 212. For example, an ultrasonic degassing system 102 may include one or more elongated ultrasonic transducer units 210 that protrude laterally or longitudinally into the interior of the vessel 124, to intersect the production fluid 110 in the flowpath 212. Such an embodiment may increase the number and coverage of the ultrasonic signals 122, thereby increasing the exposure of the production fluid 110 to the ultrasonic signals 122 and promoting the separation of the entrained gas from the production fluid 110.

Figure 9A:
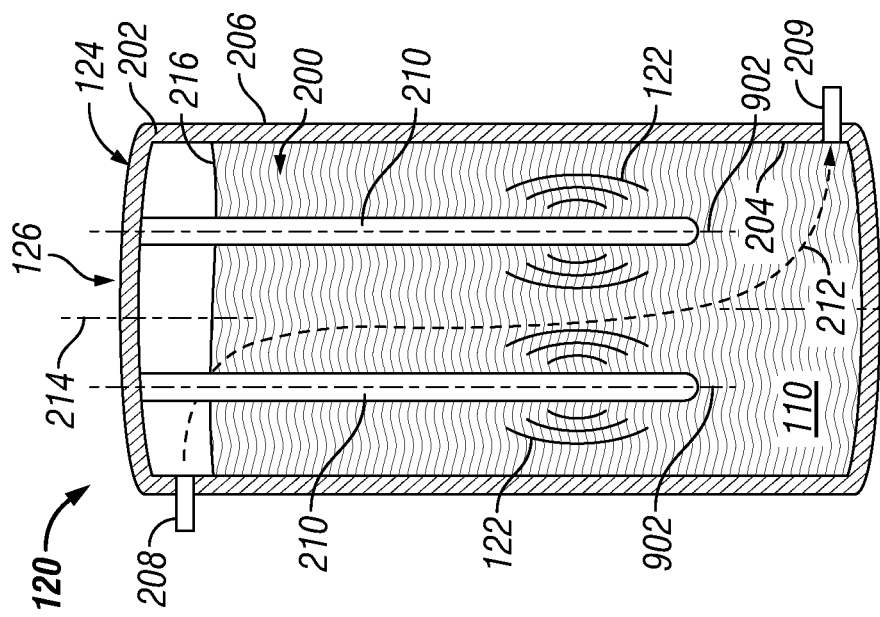
FIG. 9A is a diagram that illustrates an ultrasonic hydrocarbon degassing system including an ultrasonic transducer system having laterally oriented elongated ultrasonic transducer units in accordance with one or more embodiments.

FIG. 9A is a diagram that illustrates an ultrasonic degassing system 102 including an ultrasonic transducer system 126 having two laterally oriented elongated ultrasonic transducer units 210 in accordance with one or more embodiments. An elongated ultrasonic transducer units 210 may have a body having a length that is greater than its width For example, an elongated ultrasonic transducer units 210 may have a cylindrical body having a length that is about 25% greater or more than its outer diameter. In the illustrated embodiment, the ultrasonic transducer units 210 protrude laterally into the interior of the vessel 124, each having a longitudinal axis 902 extending perpendicular to the longitudinal axis 214 of the vessel 124 and the flowpath 212 of the production fluid 110. During operation, the laterally oriented elongated ultrasonic transducer units 210 may intersect the production fluid 110 in the flowpath 212 in series, one after the other. In some embodiments, the laterally oriented elongated ultrasonic transducer units 210 are coupled to the side wall of the vessel 124. For example, the elongated ultrasonic transducer units 210 may be installed through and fastened to an access hatch or port, such as a manway access, in the side wall of the vessel 124. Although two laterally oriented elongated ultrasonic transducer units 210 are depicted for the purpose of illustration, any suitable number of laterally oriented elongated ultrasonic transducer units 210 may be employed (e.g., 1, 3, 4, 5 or more laterally oriented elongated ultrasonic transducer units 210 may be employed). In some embodiments, a laterally oriented elongated ultrasonic transducer unit 210 extends substantially across the width of the vessel 124. For example, in the case of the vessel being a cylinder, a laterally oriented elongated ultrasonic transducer unit 210 may extend greater than about 40% (e.g., about 50%, 60%, 70%, 80% or 90%), or the entirety of, the internal diameter of the vessel 124.

Figure 9B:
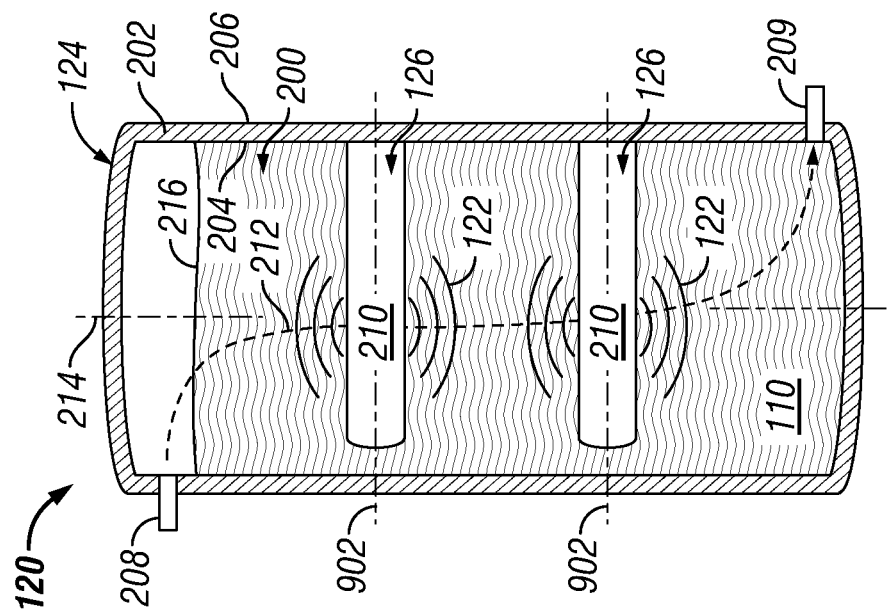
FIG. 9B is a diagram that illustrates an ultrasonic hydrocarbon degassing system including an ultrasonic transducer system having longitudinally oriented elongated ultrasonic transducer units in accordance with one or more embodiments.

FIG. 9B is a diagram that illustrates an ultrasonic degassing system 102 including an ultrasonic transducer system 126 having two longitudinally oriented elongated ultrasonic transducer units 210 in accordance with one or more embodiments. In the illustrated embodiment, the ultrasonic transducer units 210 protrude longitudinally into the interior of the vessel 124, each having a longitudinal axis 902 extending parallel to the longitudinal axis 214 of the vessel 124 and the flowpath 212 of the production fluid 110. During operation, the longitudinally oriented elongated ultrasonic transducer units 210 may intersect the production fluid 110 in the flowpath 212 in parallel. In some embodiments, the longitudinally oriented elongated ultrasonic transducer units 210 are coupled to an end cap of the vessel 124. For example, the elongated ultrasonic transducer units 210 may be installed through and fastened to an access hatch or port, such as a manway access, in a top end cap of the vessel 124. Although two longitudinally oriented elongated ultrasonic transducer units 210 are depicted for the purpose of illustration, any suitable number of longitudinally oriented elongated ultrasonic transducer units 210 may be employed (e.g., 1, 3, 4, 5 or more longitudinally oriented elongated ultrasonic transducer units 210 may be employed). In some embodiments, a longitudinally oriented elongated ultrasonic transducer unit 210 extends substantially across the length of the vessel 124. For example, in the case of the vessel being a cylinder, a longitudinally oriented elongated ultrasonic transducer unit 210 may extend greater than about 40% (e.g., about 50%, 60%, 70%, 80% or 90%), or the entirety of, the interior length of the vessel 124.

Embodiments of the ultrasonic degassing system 102 can be employed in a variety of context, including various locations within a hydrocarbon processing system. For example, the ultrasonic degassing system 102 may be employed in conjunction with a vapor recovery system (VRS) of the hydrocarbon processing system 100. In such an embodiment, the vessel 124 of the ultrasonic degassing system 102 may include a VRV. Further, in such an embodiment, one or more ultrasonic transducer units 210 may be positioned to transmit ultrasonic signals 122 into production fluid 110 traveling through the interior of the VRV. The ultrasonic signals 122 may cause the entrained gas to separate from the production fluid 110, and the separated gas may be captured and removed by the vapor recovery system 128. The recovered gas may, for example, be sold, flared off, or otherwise disposed of in a responsible and environmentally safe manner.

Figure 10C:
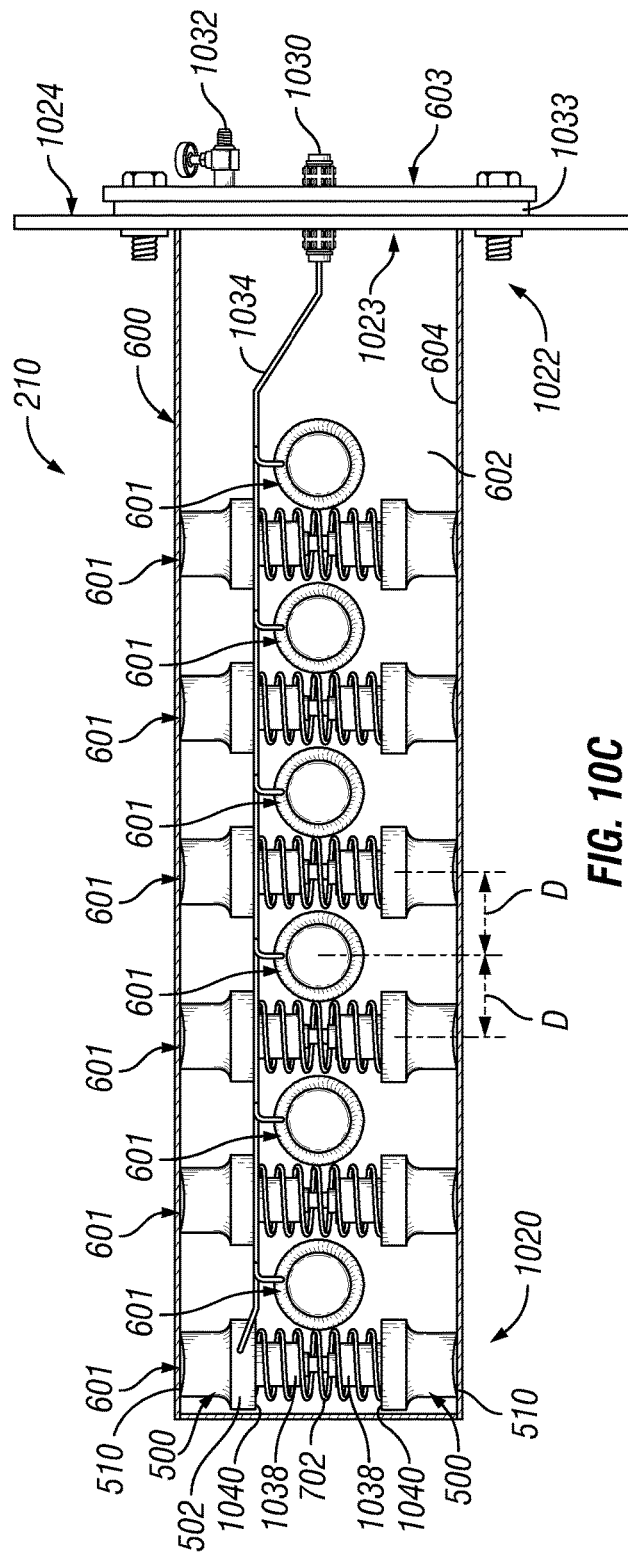
Figure 10D:
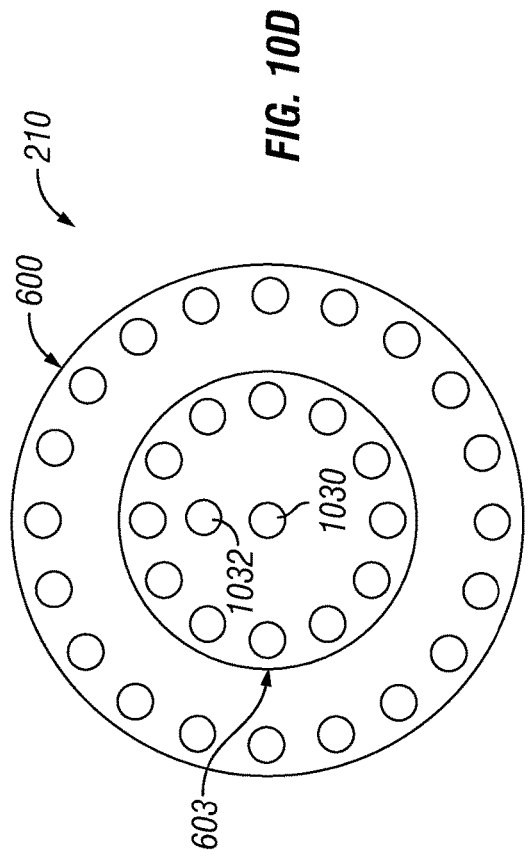

FIG. 10A is a diagram that illustrates an example ultrasonic degassing system 102 in accordance with one or more embodiments. In the illustrated embodiment, the ultrasonic degassing system 102 includes a vertically oriented vessel 124, and an ultrasonic transducer system 126 including a laterally oriented ultrasonic transducer unit 210. FIGS. 10B-10D are diagrams that illustrate perspective, cross-sectioned side and end views, respectively, of the ultrasonic transducer unit 210 of the ultrasonic degassing system 102 of FIG. 10A, in accordance with one or more embodiments.

The vertically oriented vessel 124 may be a vapor recover tower (VRT). In the illustrated embodiment, the vessel 124 includes an access hatch 1002 located in a side wall 1004 of the vessel 124. The access hatch 1002 is defined by an access hatch hole 1005 in the side wall 1004 of the vessel 124 that provide access to the interior 200 of the vessel 124, and an access hatch flange 1006. The access hatch 1002 may be, for example, an access manway that provides access to the interior 200 of the vessel 124. The access hatch flange 1006 includes mounting holes for use in bolting a complementary component, such as an access manway cover, to the access hatch flange 1006.

In the illustrated embodiment, the vessel 124 includes an inlet 208 located at an upper end 1010 of the vessel 124 and an outlet 209 located at a lower end 1012 of the vessel 124. The flowpath 212 may extend from the inlet 208 of the vessel 124 to the outlet 209 of the vessel 124. During operation, production fluid 110 may enter the vessel 124 by way of the inlet 208, travel downward in the interior 200 of the vessel 124, along the flowpath 212, and exit the vessel 124 by way of the outlet 209. A conduit 1013 of the vapor recovery system 128 may be in fluid communication with an upper end of the interior 200, and vapor recovery system 128 may remove the separated gas by way of the conduit 1013.

In the illustrated embodiment, the ultrasonic transducer unit 210 extends laterally, through the access hatch 1002, into the interior 200 of the vessel 124, such that the longitudinal axis 902 of the ultrasonic transducer unit 210 is perpendicular to the longitudinal axis 214 of the vessel 124. In such an embodiment, the ultrasonic transducer unit 210 laterally intersects the flowpath 212 of the production fluid 110 that is generally parallel to the longitudinal axis 214. The ultrasonic transducer unit 210 may be operated to generate ultrasonic signals 122 that are transmitted into the production fluid 110, as the production fluid 110 moves through the interior 200 of the vessel 124, along the flowpath 212, causing the entrained gas to separate from the production fluid 110.

In the illustrated embodiment, the housing 600 of the ultrasonic transducer unit 210 includes a hollow, cylindrically shaped tube, defining a cylindrically shaped interior 602. A trailing end 1022 of the housing 600 includes an access port 1023 and a transducer unit flange 1024. The transducer unit flange 1024 includes an outer set of mounting holes for use in securing the housing 600 to the vessel 124, and an inner set of mounting holes for use in securing the access panel 603 to the housing 600.

In the illustrated embodiment, the access panel 603 includes an electrical pass through 1030 and a purge port 1032. The electrical pass through 1230 may provide a conduit for the passage of an electrical wiring harness 1034 between the ultrasonic transducer assemblies disposed in the interior 200 of the housing 600, and an ultrasonic generator 1036 located external to the housing 600. The electrical pass through 1030 may include a sealed interface such that the interior 602 of the housing 600 is isolated from the surrounding environment, and can be maintained at a desired pressure. The purge port 1032 may provide a conduit for regulating pressure in the interior 602 of the housing 600 or introducing substances, such as nitrogen, into the interior 602 of the housing 600. A gasket 1033 may be disposed between the access panel 603 and the transducer unit flange 1024. The gasket 1033 may provide a fluid seal between the interior 602 of the housing 600 and the surrounding environment.

In the illustrated embodiment, the ultrasonic transducer unit 210 includes twelve ultrasonic transducer assemblies 601, each including dual-opposing ultrasonic transducer heads 500. The transmission surface 510 of each of the ultrasonic transducer heads 500 may have a shape that is complementary to the interior surface 604 of the housing 600. For example, the transmission surface 510 of each of the ultrasonic transducer heads 500 may have a curvature having a radius that is the same or similar to the radius of the interior surface 604 of the housing 600. In the illustrated embodiment, the body 502 of each of the ultrasonic transducer heads 500 includes a stem 1038 and a shoulder 1040. Further, the biasing member 702 of each of the ultrasonic transducer assemblies 601 includes a spring that is disposed around the stems 1038 of the pair of ultrasonic transducer heads 500 of the ultrasonic transducer assembly 601, with opposite ends of the spring engaging the shoulders 1040 of the bodies 502 of the pair of ultrasonic transducer heads 500 of the ultrasonic transducer assembly 601. The stem 1038 may help to secure the spring in position, and guide movement of the bodies 502 and the spring during retraction and expansion of the ultrasonic transducer assembly 601. In the illustrated embodiment, each of the twelve ultrasonic transducer assemblies 601 are linearly offset by an offset distance (D) (e.g., about 0.25 m) and an angular offset of about 90 degrees. Each of the ultrasonic transducer assemblies 601 may be electrically coupled to the ultrasonic generator 1036 by way of the electrical wiring harness 1034.

Assembly of the ultrasonic transducer unit 210 may include the following: removing the access panel 603 from the housing 600; positioning each of the twelve ultrasonic transducer assemblies 601 into their respective positions within the interior 602 of the housing 600; passing the electrical wiring harness 1034 through the electrical pass through 1030 of the access panel 603; fastening bolts through the mounting holes of the access panel 603 and the inner set of mounting holes of the transducer unit flange 1024 to secure the access panel 603 to the housing 600 and to seal-off the interior 602 of the housing 600 from the surrounding environment; and injecting gas, such as nitrogen, into the interior 602 of the housing 600 by way of the purge port 1032 to pressurize the interior 602 of the housing 600 to a pressure above the operating pressure at the interior 200 the vessel 134. Such a pressurization may inhibit substances, such as production fluid 110, from entering the interior 602 of the housing 600 during use. The positioning of each of the twelve ultrasonic transducer assemblies 601 into their respective positions within the interior 602 of the housing 600 may include, for each of the twelve ultrasonic transducer assemblies 601 performing the following: attaching the ultrasonic transducer assembly 601 to the electrical wiring harness 1034; compressing the ultrasonic transducer assembly 601 into a retracted state such the height of the ultrasonic transducer assembly 601 is less than the diameter of the interior 602 of the housing 600; moving the ultrasonic transducer assembly 601 longitudinally along the interior 602 of the housing 600, into position within the interior 602 of the housing 600; releasing or otherwise de-compressing the ultrasonic transducer assembly 601, to move the ultrasonic transducer assembly 601 into an expanded state such the transmission surfaces 510 of the ultrasonic transducer assembly 601 engage corresponding portions of the interior surface 604 of the housing 600. Disassembly of the ultrasonic transducer unit 210 may be the reverse of that described for assembly.

Assembly of the ultrasonic transducer unit 210 into the vessel 134 may include the following: inserting a leading end 1020 of the housing 600 into and through the access hatch 1002 and into the interior 200 of the vessel 124; and fastening bolts through the outer set of mounting holes of the transducer unit flange 1024 of the housing 600 and the complementary mounting holes of the access hatch flange 1006 of the access hatch 1002 of the vessel 124, to secure the housing 600 to the vessel 124. Disassembly of the ultrasonic degassing unit 120 from the vessel 134 may be the reverse of that described for assembly. Assembly of ultrasonic transducer unit 210 may be performed before, after or during assembly of the ultrasonic transducer unit 210 into the vessel 134.

Such a modular configuration can provide flexibility in the installation and maintenance of the ultrasonic degassing system 102. For example, the housing 600 may be secured to the vessel 124, and assembly of the ultrasonic transducer unit 210 can take place with the housing 600 already secured to the vessel 124. As a further example, the ultrasonic transducer assemblies 601 can be accessed for maintenance or replacement by simply removing the access panel 603 of the housing 600, without having to remove the housing 600 from the vessel 124. This may allow the vessel 124 to remain in a sealed state, with minimal or no interruption of the flow of the production fluid 110 through the vessel 124, during installation, inspection, replacement, repositioning or removal of the ultrasonic transducer assemblies 601.

Operation of the ultrasonic degassing system 102 can include providing a flow of the production fluid 110 through the inlet 208 of the vessel 124, and operating the ultrasonic transducer unit 210 to transmit the ultrasonic signals 122. In some embodiments, operating the ultrasonic transducer unit 210 includes operating the ultrasonic generator 1036 to supply a voltage of a desired ultrasonic frequency (e.g., 25 kHz), to the ultrasonic transducer assemblies 601, which in turn causes the transducer heads 500 of the ultrasonic transducer assemblies 601 to generate the ultrasonic signals 122 that are transmitted through the housing 600 and into the production fluid 110 surrounding the housing 600. As the production fluid 110 flows from the inlet 208 of the vessel 124 to the outlet 209 of the vessel 134, along the flowpath 212, the ultrasonic signals 122 generated by the ultrasonic transducer unit 210 may be transmitted into the production fluid 110 surrounding the ultrasonic transducer unit 210, causing the entrained gas to separate from the production fluid 110 and rise to the upper end 1010 of the interior 200 of the vessel 124, where it can be collected and disposed of by a vapor recovery system (e.g., vapor recovery system 128). The degassed production fluid 110 may flow to the lower end 1012 of the vessel 124, and exit the vessel 124 by way of the outlet 209.

Figure 11:
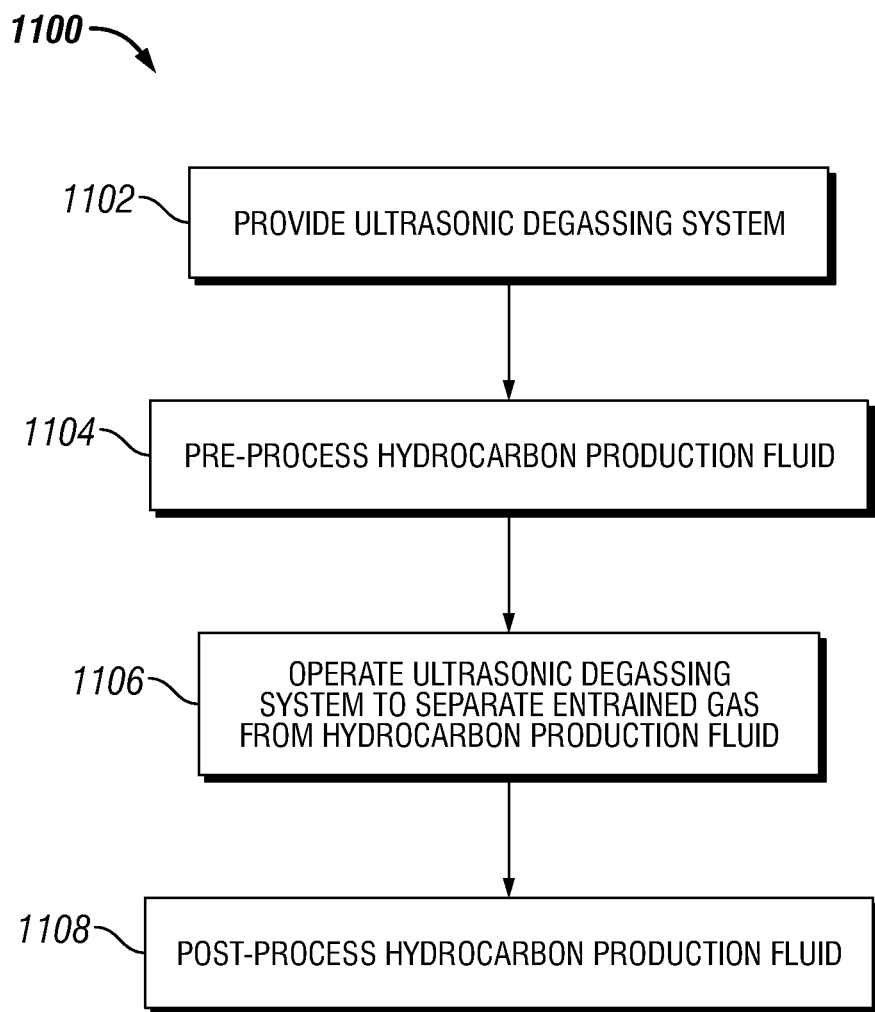
FIG. 11 is a flowchart that illustrates a method of degassing hydrocarbon production fluid in accordance with one or more embodiments.

FIG. 11 is a flowchart that illustrates a method 1100 of degassing hydrocarbon production fluid in accordance with one or more embodiments. The method 1100 may include providing an ultrasonic degassing system (block 1102). In some embodiments, providing an ultrasonic degassing system includes providing an ultrasonic degassing system similar to that of the ultrasonic degassing system 102. For example, providing an ultrasonic degassing system may include assembling or otherwise providing the hydrocarbon processing system 100, including the ultrasonic degassing system 102. The ultrasonic degassing system 102 may include one or more ultrasonic degassing units 120, each including a vessel 124 and an ultrasonic transducer system 126. Each of the ultrasonic transducer system 126 may include one or more ultrasonic transducer units 210, each including one or more ultrasonic transducer heads 500, as described here.

The method 300 may include conducting pre-processing of the hydrocarbon production fluid (block 1104). In some embodiments, conducting pre-processing of hydrocarbon production fluid includes the upstream processing system 104 processing raw/unprocessed production fluid 110 to generate pre-processed production fluid 110 for processing by the ultrasonic degassing system 102. For example, the upstream processing system 104 may include a water separator system, a heater treater system or a pressure reduction system. The water separator system may operate to separate and remove some or all of water contained in the production fluid 110, from the production fluid 110. The heater treater system may operate to heat the production fluid 110 to promote the separation of entrained gas from the production fluid 110. The pressure reduction system may operate to reduce the pressure of the production fluid 110 to, for example, promote the separation of entrained gas from the production fluid 110.

The method 300 may include operating the ultrasonic degassing system to separate entrained gas from the hydrocarbon production fluid (block 1106). In some embodiments, operating the ultrasonic degassing system to separate entrained gas from hydrocarbon production fluid includes providing a flow of production fluid 110 (e.g., raw or pre-processed production fluid 110) through the ultrasonic degassing system 102, and operating the ultrasonic degassing system 102 to transmit ultrasonic signals 122 into the production fluid 110 to cause entrained gas of the production fluid 110 to separate from the production fluid 110. Continuing with the above example, operating the ultrasonic degassing system to separate entrained gas from hydrocarbon production fluid may include introducing production fluid 110 through an inlet 208 of the vessel 124 such that it flows along the flowpath 212, to an outlet 209 of the vessel 124, and controlling an ultrasonic generator (e.g., ultrasonic generator 1036) to generate source signals that drive the one or more ultrasonic transducer heads 500 to generate ultrasonic signals 122 that are transmitted into the production fluid 110 as it flows around the one or more ultrasonic transducer units 210, as described here. In some embodiments, the source signal may include an AC voltage of a frequency in the range of about 20 kHz to 40 kHz, such as about 25 kHz, which causes the ultrasonic transducer heads 500 to generate corresponding ultrasonic signals 122 having a frequency of about 20 kHz to 40 kHz, such as about 25 kHz. In some embodiments, the gas separated from the production fluid 110 is removed by the vapor recovery system 128. The recovered gas may, for example, be sold, flared-off, or otherwise disposed of in a responsible and environmentally safe manner.

The method 300 may include conducting post-processing of the hydrocarbon production fluid (block 1108). In some embodiments, conducting post-processing of hydrocarbon production fluid includes the downstream processing system 106 processing degassed production fluid 110 to generate processed production fluid 110. For example, the downstream processing system 106 may include a water separator system, a heater treater system or a pressure reduction system. The water separator system may operate to separate and remove some or all of water contained in the production fluid 110, from the production fluid 110. The heater treater system may operate to heat the production fluid 110 to promote the separation of entrained gas from the production fluid 110. The pressure reduction system may operate to reduce the pressure of the production fluid 110 to, for example, promote the separation of entrained gas from the production fluid 110.

In some embodiments, operation of the ultrasonic degassing system 102 or other components of the hydrocarbon processing system 100 are controlled by the process controller 150. For example, the process controller 150 may control and monitor the flowrate of production fluid 110 into and through the vessel 134, may control and monitor operation of the ultrasonic generator 1036, or may monitor and control operation of the vapor recovery system 128, the upstream processing system 104, or the downstream processing system 106.

Figure 12:
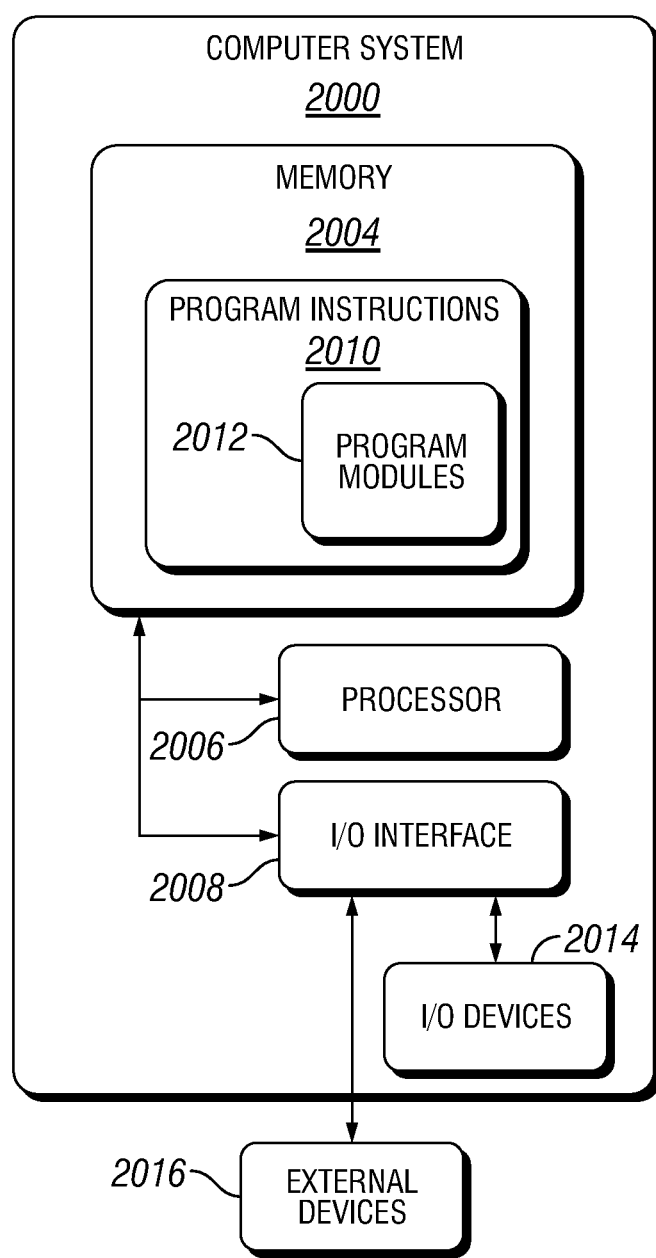
FIG. 12 is a diagram that illustrates an example computer system in accordance with one or more embodiments.

FIG. 12 is a diagram that illustrates an example computer system (or "system") 2000 in accordance with one or more embodiments. In some embodiments, the system 2000 is a programmable logic controller (PLC). The system 2000 may include a memory 2004, a processor 2006 and an input/output (I/O) interface 2008. The memory 2004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (for example, CD-ROM or DVD-ROM, hard drives). The memory 2004 may include a non-transitory computer-readable storage medium having program instructions 2010 stored thereon. The program instructions 2010 may include program modules 2012 that are executable by a processor (e.g., the processor 2006) to cause the functional operations described, such as those described with regard to operation of the processing system 100, including the ultrasonic degassing system 102, and method 1100.

The processor 2006 may be any suitable processor capable of executing program instructions. The processor 2006 may include a central processing unit (CPU) that carries out program instructions (e.g., the program instructions of the program modules 2012) to perform the arithmetical, logical, or I/O operations described. The processor 2006 may include one or more processors. The I/O interface 2008 may provide an interface for communication with one or more I/O devices 2014, such as a computer mouse, a keyboard, or a display screen (e.g., an electronic display for displaying a graphical user interface (GUI)). The I/O devices 2014 may include one or more of the user input devices. The I/O devices 2014 may be connected to the I/O interface 2008 by way of a wired connection (e.g., an Industrial Ethernet connection) or a wireless connection (e.g., a Wi-Fi connection). The I/O interface 2008 may provide an interface for communication with one or more external devices 2016, such as an ultrasonic source signal generator, sensors, valves, pumps, motors, or other computers and networks.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted or modified. Portions of the processes and methods may be implemented in software or hardware, or a combination thereof. For example, some or all of the portions of the processes and methods may be implemented by a computer system.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless the content clearly indicates otherwise. That is, a description of an element including A or B may refer to the element including one or both of A and B. As used throughout this application, the phrase "based on" does not limit the associated operation to being solely based on a particular item, unless the content clearly indicates otherwise. Thus, for example, processing "based on" data A may include processing based at least in part on data A and based at least in part on data B. As used throughout this application, the term "from" does not limit the associated operation to being directly from, unless the content clearly indicates otherwise. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. An ultrasonic transducer system comprising:
    a hollow cylindrical ultrasonic transducer housing comprising an interior surface defining an interior region; and
    an ultrasonic transducer assembly configured to be disposed in an interior region of the ultrasonic transducer housing, the ultrasonic transducer assembly comprising:
        a first ultrasonic transducer head configured to transmit a first set of ultrasonic signals, the first ultrasonic transducer head comprising a first transmission surface and being configured to direct the first set of ultrasonic signals through the first transmission surface;
        a second ultrasonic transducer head configured to transmit a second set of ultrasonic signals, the second ultrasonic transducer head comprising a second transmission surface and being configured to direct the second set of ultrasonic signals through the second transmission surface; and
        a transducer biasing member disposed between the first ultrasonic transducer head and the second ultrasonic transducer head, the transducer biasing member configured to bias the first ultrasonic transducer and the second ultrasonic transducer in opposite directions to bias the first transmission surface of the first ultrasonic transducer against a first portion of the interior surface of the ultrasonic transducer housing and to bias the second transmission surface of the second ultrasonic transducer against a second portion of the interior surface of the ultrasonic transducer housing that is opposite the first portion of the interior surface of the ultrasonic transducer housing wherein the transducer biasing member comprises a spring.

2. The system of claim 1, wherein the interior surface of the ultrasonic transducer housing comprises a cylindrical shape,
    wherein the first transmission surface of the first ultrasonic transducer comprises a first curvature that is complementary to a curvature of the cylindrical shape of the interior surface of the ultrasonic transducer housing, and
    wherein the second transmission surface of the second ultrasonic transducer comprises a second curvature that is complementary to the curvature of the cylindrical shape of the interior surface of the ultrasonic transducer housing.

3. The system of claim 1, wherein the spring comprises a coil spring.

4. The system of claim 1, further comprising a plurality of ultrasonic transducer assemblies disposed along a length of the interior region of the ultrasonic transducer housing, wherein the ultrasonic transducer assembly is one of the plurality of ultrasonic transducer assemblies.

5. The system of claim 1, further comprising:
a second ultrasonic transducer assembly configured to be disposed in the interior region of the ultrasonic transducer housing, the second ultrasonic transducer assembly comprising:
a third ultrasonic transducer head configured to transmit a third set of ultrasonic signals, the third ultrasonic transducer head comprising a third transmission surface and being configured to direct the third set of ultrasonic signals through the third transmission surface;
a fourth ultrasonic transducer head configured to transmit a fourth set of ultrasonic signals, the fourth ultrasonic transducer head comprising a fourth transmission surface and being configured to direct the fourth set of ultrasonic signals through the fourth transmission surface; and
a second transducer biasing member disposed between the third ultrasonic transducer head and the fourth ultrasonic transducer head, the second transducer biasing member configured to bias the third ultrasonic transducer and the fourth ultrasonic transducer in opposite directions to bias the third transmission surface of the third ultrasonic transducer against a third portion of the interior surface of the ultrasonic transducer housing and to bias the fourth transmission surface of the fourth ultrasonic transducer against a fourth portion of the interior surface of the ultrasonic transducer housing that is opposite from the third portion of the interior surface of the ultrasonic transducer housing.

6. The system of claim 5, wherein the first and second ultrasonic transducers are biased in opposite directions along a first axis, and the third and fourth ultrasonic transducers are biased in opposite directions along a second axis.

7. The system of claim 6, wherein the first axis is angularly offset from the second axis.

8. The system of claim 7, wherein the first axis is angularly offset from the second axis by an angle of 90 degrees.

9. The system of claim 6, wherein the first axis is linearly offset from the second axis.

10. The system of claim 9, wherein the first axis is parallel to the second axis.

11. The system of claim 1, wherein the ultrasonic transducer housing comprises:
an ultrasonic transducer housing body; and
an ultrasonic transducer housing access panel configured to be removably coupled to an end of the ultrasonic transducer housing body to define the interior region of the ultrasonic transducer housing.

12. The system of claim 11, wherein the ultrasonic transducer housing body comprises a flange configured to couple to a complementary flange of a vessel.

13. The system of claim 12, wherein the complementary flange of the vessel comprises a manway access hatch flange.

14. The system of claim 11, wherein the ultrasonic transducer housing access panel comprises a purge port configured to enable the injection of substances into the interior region of the ultrasonic transducer housing.

15. The system of claim 11, wherein the ultrasonic transducer housing access panel comprises an electrical pass through comprising a conduit for the passage of an electrical wiring harness between ultrasonic transducer assemblies disposed in the interior region of the ultrasonic transducer housing and an ultrasonic generator located external to the ultrasonic transducer housing.

16. The system of claim 1, further comprising:
an ultrasonic signal generator power supply configured to supply electrical signals to drive the first ultrasonic transducer to transmit the first set of ultrasonic signals and to drive the second ultrasonic transducer to transmit the second set of ultrasonic signals.

17. An ultrasonic transducer system comprising:
an ultrasonic transducer assembly configured to be disposed in an interior region of an ultrasonic transducer housing, the ultrasonic transducer assembly comprising:
a first ultrasonic transducer head configured to transmit a first set of ultrasonic signals, the first ultrasonic transducer head comprising a first transmission surface and being configured to direct the first set of ultrasonic signals through the first transmission surface;
a second ultrasonic transducer head configured to transmit a second set of ultrasonic signals, the second ultrasonic transducer head comprising a second transmission surface and being configured to direct the second set of ultrasonic signals through the second transmission surface; and
a transducer biasing member disposed between the first ultrasonic transducer head and the second ultrasonic transducer head, the transducer biasing member configured to bias the first ultrasonic transducer and the second ultrasonic transducer in opposite directions to bias the first transmission surface of the first ultrasonic transducer against a first portion of an interior surface of the ultrasonic transducer housing and to bias the second transmission surface of the second ultrasonic transducer against a second portion of the interior surface of the ultrasonic transducer housing that is opposite the first portion of the interior surface of the ultrasonic transducer housing, wherein the transducer biasing member comprises a spring.

18. The system of claim 17, wherein the spring comprises a coil spring.

19. The system of claim 17, further comprising a second ultrasonic transducer assembly disposed in the interior region of the ultrasonic transducer housing, the second ultrasonic transducer assembly comprising:
a third ultrasonic transducer head configured to transmit a third set of ultrasonic signals, the third ultrasonic transducer head comprising a third transmission surface and being configured to direct the third set of ultrasonic signals through the third transmission surface;
a fourth ultrasonic transducer head configured to transmit a fourth set of ultrasonic signals, the fourth ultrasonic transducer head comprising a fourth transmission surface and being configured to direct the fourth set of ultrasonic signals through the fourth transmission surface; and
a second transducer biasing member disposed between the third ultrasonic transducer head and the fourth ultrasonic transducer head, the second transducer biasing member configured to bias the third ultrasonic transducer and the fourth ultrasonic transducer in opposite directions to bias the third transmission surface of the third ultrasonic transducer against a third portion of the interior surface of the ultrasonic transducer housing and to bias the fourth transmission surface of the fourth ultrasonic transducer against a fourth portion of the interior surface of the ultrasonic transducer housing that is opposite from the third portion of the interior surface of the ultrasonic transducer housing.

20. The system of claim 19, wherein the first and second ultrasonic transducers are biased in opposite directions along a first axis, and the third and fourth ultrasonic transducers are biased in opposite directions along a second axis.

21. The system of claim 20, wherein the first axis is angularly offset from the second axis.

22. The system of claim 21, wherein the first axis is angularly offset from the second axis by an angle of 90 degrees.

23. The system of claim 20, wherein the first axis is linearly offset from the second axis.

24. The system of claim 23, wherein the first axis is parallel to the second axis.

25. An ultrasonic transducer system comprising:
   a hollow cylindrical ultrasonic transducer housing comprising an interior surface defining an interior region; and
   an ultrasonic transducer assembly configured to be disposed in an interior region of the ultrasonic transducer housing, the ultrasonic transducer assembly comprising:
      a first ultrasonic transducer head configured to transmit a first set of ultrasonic signals, the first ultrasonic transducer head comprising a first transmission surface and being configured to direct the first set of ultrasonic signals through the first transmission surface;
      a second ultrasonic transducer head configured to transmit a second set of ultrasonic signals, the second ultrasonic transducer head comprising a second transmission surface and being configured to direct the second set of ultrasonic signals through the second transmission surface; and
      a transducer biasing member disposed between the first ultrasonic transducer head and the second ultrasonic transducer head, the transducer biasing member configured to bias the first ultrasonic transducer and the second ultrasonic transducer in opposite directions to bias the first transmission surface of the first ultrasonic transducer against a first portion of the interior surface of the ultrasonic transducer housing and to bias the second transmission surface of the second ultrasonic transducer against a second portion of the interior surface of the ultrasonic transducer housing that is opposite the first portion of the interior surface of the ultrasonic transducer housing,
   a second ultrasonic transducer assembly configured to be disposed in the interior region of the ultrasonic transducer housing, the second ultrasonic transducer assembly comprising:
      a third ultrasonic transducer head configured to transmit a third set of ultrasonic signals, the third ultrasonic transducer head comprising a third transmission surface and being configured to direct the third set of ultrasonic signals through the third transmission surface;
      a fourth ultrasonic transducer head configured to transmit a fourth set of ultrasonic signals, the fourth ultrasonic transducer head comprising a fourth transmission surface and being configured to direct the fourth set of ultrasonic signals through the fourth transmission surface; and
      a second transducer biasing member disposed between the third ultrasonic transducer head and the fourth ultrasonic transducer head, the second transducer biasing member configured to bias the third ultrasonic transducer and the fourth ultrasonic transducer in opposite directions to bias the third transmission surface of the third ultrasonic transducer against a third portion of the interior surface of the ultrasonic transducer housing and to bias the fourth transmission surface of the fourth ultrasonic transducer against a fourth portion of the interior surface of the ultrasonic transducer housing that is opposite from the third portion of the interior surface of the ultrasonic transducer housing,
   wherein the first and second ultrasonic transducers are biased in opposite directions along a first axis, and the third and fourth ultrasonic transducers are biased in opposite directions along a second axis, and wherein the first axis is linearly offset from the second axis.

26. The system of claim 25, wherein the first transducer biasing member comprises a spring, and wherein the second transducer biasing member comprises a spring.

27. An ultrasonic transducer system comprising:
   an ultrasonic transducer assembly configured to be disposed in an interior region of an ultrasonic transducer housing, the ultrasonic transducer assembly comprising:
      a first ultrasonic transducer head configured to transmit a first set of ultrasonic signals, the first ultrasonic transducer head comprising a first transmission surface and being configured to direct the first set of ultrasonic signals through the first transmission surface;
      a second ultrasonic transducer head configured to transmit a second set of ultrasonic signals, the second ultrasonic transducer head comprising a second transmission surface and being configured to direct the second set of ultrasonic signals through the second transmission surface; and
      a transducer biasing member disposed between the first ultrasonic transducer head and the second ultrasonic transducer head, the transducer biasing member configured to bias the first ultrasonic transducer and the second ultrasonic transducer in opposite directions to bias the first transmission surface of the first ultrasonic transducer against a first portion of an interior surface of the ultrasonic transducer housing and to bias the second transmission surface of the second ultrasonic transducer against a second portion of the interior surface of the ultrasonic transducer housing that is opposite the first portion of the interior surface of the ultrasonic transducer housing,
   a second ultrasonic transducer assembly disposed in the interior region of the ultrasonic transducer housing, the second ultrasonic transducer assembly comprising:
      a third ultrasonic transducer head configured to transmit a third set of ultrasonic signals, the third ultrasonic transducer head comprising a third transmission surface and being configured to direct the third set of ultrasonic signals through the third transmission surface;
      a fourth ultrasonic transducer head configured to transmit a fourth set of ultrasonic signals, the fourth ultrasonic transducer head comprising a fourth transmission surface and being configured to direct the fourth set of ultrasonic signals through the fourth transmission surface; and a second transducer biasing member disposed between the third ultrasonic transducer head and the fourth ultrasonic transducer head, the second transducer biasing member configured to bias the third ultrasonic transducer and the fourth ultrasonic transducer in opposite directions to bias the third transmission surface of the third ultrasonic transducer against a third portion of the interior surface of the ultrasonic transducer housing and to bias the fourth transmission surface of the fourth ultrasonic transducer against a fourth portion of the interior surface of the ultrasonic transducer housing that is opposite from the third portion of the interior surface of the ultrasonic transducer housing, wherein the first and second ultrasonic transducers are biased in opposite directions along a first axis, and the third and fourth ultrasonic transducers are biased in opposite directions along a second axis, and wherein the first axis is linearly offset from the second axis.

28. The system of claim 27, wherein the first transducer biasing member comprises a spring, and wherein the second transducer biasing member comprises a spring.

* * * * *